US012800753B2

(12) United States Patent
Dogan et al.

(10) Patent No.: US 12,800,753 B2
(45) Date of Patent: Nov. 17, 2026

(54) REDUCING AMBIGUITIES IN SYNTHETIC APERTURE RADAR IMAGES

(71) Applicant: ICEYE OY, Espoo (FI)

(72) Inventors: Ozan Dogan, Espoo (FI); Vladimir Ignatenko, Espoo (FI)

(73) Assignee: ICEYE OY, Espoo (FI)

( * ) Notice: Subject to any disclaimer, the term of this patent is extended or adjusted under 35 U.S.C. 154(b) by 32 days.

(21) Appl. No.: 18/832,350

(22) PCT Filed: Dec. 20, 2022

(86) PCT No.: PCT/EP2022/087007
§ 371 (c)(1),
(2) Date: Jul. 23, 2024

(87) PCT Pub. No.: WO2023/143828
PCT Pub. Date: Aug. 3, 2023

(65) Prior Publication Data
US 2025/0147174 A1 May 8, 2025

(30) Foreign Application Priority Data
Jan. 31, 2022 (GB) ..................................... 2201195

(51) Int. Cl.
*G01S 7/282* (2006.01)
*G01S 7/292* (2006.01)
*G01S 13/90* (2006.01)

(52) U.S. Cl.
CPC ........... *G01S 13/9011* (2013.01); *G01S 7/282* (2013.01); *G01S 7/292* (2013.01)

(58) Field of Classification Search
CPC ...... G01S 13/9011; G01S 7/282; G01S 7/292; G01S 13/325; G01S 13/345; G01S 13/9054; G01S 13/9004; G01S 13/90
See application file for complete search history.

(56) References Cited

U.S. PATENT DOCUMENTS 10,754,028 B2 * 8/2020 Villano ............... G01S 13/9011
2010/0171651 A1 * 7/2010 Scheiber ............... G01S 7/2813
342/179

(Continued)

FOREIGN PATENT DOCUMENTS

WO 2023/143828 A1 8/2023

OTHER PUBLICATIONS

Villano, Michelangelo, et al., "Waveform-Encoded SAR: A Novel Concept for Nadir Echo and Range Ambiguity Suppression", EUSAR 23018; 12th European Conference on Synthetic Aperture Radar, Jun. 7, 2018, pp. 200-215.

(Continued)

*Primary Examiner* — Resha Desai
*Assistant Examiner* — Bongani Jabulani Mashele
(74) *Attorney, Agent, or Firm* — Cozen O'Connor

(57) ABSTRACT

A method of operating a synthetic aperture radar "SAR" to acquire SAR echo data for the formation of an image, comprises calculating a nadir ambiguity index for the nadir of the platform; determining a frequency sweep direction sequence for successive pulses of a waveform to be transmitted by the SAR based on the nadir ambiguity index; obtaining a relative phase sequence for the successive pulses of the waveform; and encoding the waveform with the determined frequency sweep direction sequence and the relative phase sequence.

20 Claims, 13 Drawing Sheets

(56) References Cited

U.S. PATENT DOCUMENTS

| | | | |
|---|---|---|---|
| 2018/0284262 | A1 | 10/2018 | Villano et al. |
| 2019/0072665 | A1 | 3/2019 | Wang et al. |
| 2019/0346556 | A1 | 11/2019 | Wang et al. |

OTHER PUBLICATIONS

Dall, J., et al., Azimuth phase coding for range ambiguity suppression in SAR, Geoscience and Remote Sensing Symposium, 2004, IGARSS 04, Proceedings, 2004 IEEE International Anchorage, AK, vol. 3, Sep. 20, 2024, pp. 1734-1737.

Xu, Wei, et al., "Azimuth Phase Coding by Up and Down Chirp Modulation for Range Ambiguity Suppression", IEEE Access, vol. 7, Oct. 1, 2019, pp. 143780-143791.

He Xiongpeng, et al., "Range-Ambiguous Clutter Suppression for the SAR-GMTI System Based on Extended Azimuth Phase Coding", IEEE Transactions on Geoscience and Remote Sensing, vol. 58, No. 11, Nov. 1, 2020, pp. 8147-8162.

Natsuaki, Ryo, et al., "Investigations on the Optimum Combination of Azimuth Phase Coding and Up- and Down-Chirp Modulation for Range Ambiguity Suppression", IGARSS 2019, 2019 IEEE International Geoscience and Remote Sensing Symposium, Jul. 28, 2019, pp. 2288-2291.

PCT International Written Opinion and Search Report issued in related PCT Patent Application No. PCT/EP2022/087707 mailed Mar. 13, 2023.

Wen, et al., "A A Range Ambiguity Suppression Processing Method for Spaceborne SAR with Up and Down Chirp Modulation", Sensors, MDPI, Published May 7, 2018, 15 pages.

Taiwanese Office Action issued in connection with related Taiwan Patent Application No. 112101287 dated Jul. 22, 2024.

Korean Office Action, for Korean Application No. KR 10-2024-7025810 dated Jan. 28, 2026, 6 pages. with English translation.

Korean Office Action issued in related Korean Patent Application No. 10-2024-7025810, dated Apr. 17, 2026, with English translations.

* cited by examiner

REDUCING AMBIGUITIES IN SYNTHETIC APERTURE RADAR IMAGES

This application is the National Stage filing under 35 U.S.C. 371 of International Application No. PCT/EP2022/087007 filed on 20 Dec. 2022, which claims priority to GB Application No. 2201195.1 filed on 31 Jan. 2022, the contents of both of which are hereby incorporated by reference herein in their entirety to the extent permitted by law.

FIELD OF INVENTION

The invention is in the field of imaging using synthetic aperture radar.

BACKGROUND

A Synthetic Aperture Radar (SAR) can be used to image an area on Earth, also known as a target area, by transmitting radar beams and recording the return echoes from those transmitted beams. SAR systems can be installed on airborne platforms such as aircraft, as well as in satellites operating from space. Various modes of operating the SAR can be used, such as such as stripmap, spotlight, ScanSAR (Scanning Synthetic Aperture Radar), and TOPSAR (Terran Observation with Progressive Scan SAR).

Typically, a SAR system transmits radio-frequency radiation in pulses and the records the returning echoes. The sampled data is stored for processing in order to form an image. A possible consequence of the pulsed operation of SAR is that ambiguities can arise in the image, for example from radar echoes backscattered from the nadir and other points not in the target imaging area. These ambiguities can arise because it is difficult to perfectly direct a radar beam only to the target image area. In reality, the radar beam has side lobes that also illuminate areas outside of the desired imaging area, and result in radar echoes from these "ambiguous" areas that are then mixed in with the returns from the "unambiguous" areas. These echoes of the previous and later transmitted pulses scattered from undesired regions can include the nadir, which is the point directly below the SAR platform (e.g., a satellite), at its current location. In this case, the SAR image is a combination of an unambiguous image (the desired image), a partially focused ambiguous image, and the nadir.

One way to overcome the problem of ambiguities from range ambiguous regions is to increase the size of the antenna in the elevation direction. This produces a narrower beam so that the side lobes of the beam are reduced and the signal backscattered from the ambiguous regions are also reduced. However increasing the size of the antenna contradicts with the size, weight, and power "SWAP" requirements of small satellites, as well as the need for imaging wide swaths at high resolution.

Another way that can be used in particular to suppress the nadir ambiguity is to adjust the pulse repetition frequency "PRF" so that the nadir echo time is out of the receive window of the radar. In most cases this is impractical and results in additional constraints on the PRF, which is already optimized to maximize the swath width and minimize the azimuth ambiguity to signal ratio. In addition, no suppression can be achieved with PRF tuning for ambiguous targets that are out of the blind range. Instead of applying a fixed or finely tuned PRF, another method is to use a staggered SAR system in which the ambiguities are located at different ranges for different range lines, as the time distance to the preceding and succeeding pulses continuously varies. The ambiguous energy is therefore incoherently integrated in the Doppler domain and smears as a result. Unfortunately, the suppression rate of the range ambiguity is quite limited with typical system parameters and additional signal processing algorithms are required to achieve equidistant sampling in azimuth direction.

Some ambiguity suppression methods are centred on transmitting a diversity of waveforms in order to be able to identify and suppress ambiguities from the return signal, and then suppressing the residual ambiguity by processing to separate out the ambiguous returns. It will be appreciated that in the following, unless otherwise stated, the term "focussing" is used to refer to a statistical or mathematical filtering process rather than, for example, optical focussing. An example of filtering is a convolution of the conjugate of a transmitted signal with the received signal.

The basic idea behind waveform diversity is to gain the ability to "mark" or identify the transmitted pulses that a particular return signal comes from. To achieve this the system must be able to transmit signals with different marks and to identify the scattered signals accordingly. There are at least three different waveforms proposed in literature: Up and Down Chirps (UDC), Azimuth Phase Coding (APC), and Cyclic Frequency (CF).

UDC (Up and Down Chirp) waveform diversity can be used for nadir suppression such that a good quality SAR image can be extracted. However, the energy is not suppressed, but smeared in the range direction. This can result in range stripes appearing in an image, particularly for a target that has strong backscattering properties. Since the signal is smeared rather than suppressed, the total energy of the ambiguous signal is not significantly reduced. In fact, if the total signal power of a specific target is considered, the suppression capability of UDC may be as low as 3 dB for a point target, and 0 dB for an extended one.

To overcome some of these problems with UDC, some post-processing algorithms that are based on dual focusing techniques are proposed in literature. In these techniques, raw data is focused according to the ambiguous region. The image of the ambiguous region is then thresholded and complex data is suppressed, with higher backscattering assumed to represent ambiguous targets. One downside of this technique is that some useful signal may also be lost. The last steps are defocusing back to raw data and then focusing the raw data according to the unambiguous region. However, this algorithm can be computationally intensive, so post-processing algorithms that are computationally less complex are desired.

Another waveform diversity method is APC (Azimuth Phase Coding) where the phase of each transmitted pulse is alternated to shift the Doppler bandwidth of the unambiguous target signal out of the processing band. The idea is based on setting the PRF high enough such that the unambiguous and ambiguous Doppler bandwidth of the signal is separated. Unfortunately, this results in narrower swath widths or worse azimuth resolution, neither which is desirable for SAR imaging.

CF (Cyclic Frequency) is a method that relies on shifting the frequency of the transmitted pulse cyclically to generate orthogonal waveforms. However, in this case, the required rapid frequency hop results in practical problems like abrupt power drift, complexity in the hardware implementation and increased calibration burden. In addition, SAR systems may have limited memory for storing distinct waveforms. For example, the TerraSAR-X satellite can only store up to eight different waveforms for an acquisition.

Although there are some recent efforts for combining UDC with the APC to improve the nadir suppression performance, none of these waveforms are designed to deal with the suppression of both nadir and range ambiguities in SAR images. Some embodiments of the invention described below solve some of these problems. However, the disclosure is not limited to solutions to these problems and some embodiments described can also solve other problems.

SUMMARY

This summary is provided to introduce a selection of concepts in a simplified form that are further described below in the detailed description. This summary is not intended to identify key features or essential features of the claimed subject matter, nor is it intended to be used to determine the scope of the claimed subject matter.

There is disclosed in the following A method of operating a synthetic aperture radar "SAR" to acquire SAR echo data for the formation of an image, wherein the SAR is carried on a platform travelling with respect to the surface of Earth and is directed toward the surface of Earth, the method comprising: calculating a nadir ambiguity index for the nadir of the platform; determining a frequency sweep direction sequence for successive pulses of a waveform to be transmitted by the SAR based on the nadir ambiguity index; obtaining a relative phase sequence for the successive pulses of the waveform; and encoding the waveform with the determined frequency sweep direction sequence and the relative phase sequence. As will be explained in further detail below, this encoding with frequency sweep direction and phase may be used to reduce ambiguities in SAR images.

Any of the methods described here may be implemented to operate a satellite already in orbit, and may therefore be implemented in the form of computing system configured for controlling a SAR to operate. The computing system may be onboard, e.g. on the platform carrying the SAR system, or may be distributed, for example between a platform and a ground station.

There is also provided here a computer-readable medium comprising instructions which, when implemented in a computing system forming part of a SAR operation system cause the system to any of the methods described here.

There is also provided here a SAR system configured to transmit successive pulses of radio waves to illuminate a target area according any of the methods described here.

There is also provided a pulsed radio waveform transmitted from a SAR system carried on a platform travelling with respect to the surface of Earth, wherein the waveform is encoded with a frequency sweep direction sequence for successive pulses of the radiation and the frequency sweep direction sequence varies according to the ambiguity at the nadir of the platform. The frequency sweep direction sequence may for example vary according to the distance from the platform to the nadir. The waveform may be encoded according to any of the methods described here.

There is also provided a SAR system configured for transmitting the pulsed waveform.

The waveform may be encoded with a relative phase sequence for successive pulses of the radiation, and this may vary according to the ambiguity of a point in an ambiguous region other than the nadir. The relative phase sequence may also vary according to the distance from the platform to the point outside the nadir.

Embodiments of the invention also provide a computer readable medium comprising instructions, for example in the form of an algorithm, which, when implemented in a computing system forming part of a SAR operation system, cause the system to perform any of the methods described here.

Features of different aspects and embodiments of the invention may be combined as appropriate, as would be apparent to a skilled person, and may be combined with any of the aspects of the invention.

BRIEF DESCRIPTION OF THE DRAWINGS

Embodiments of the invention will be described, by way of example only and with reference to the following drawings, in which.

Figure 1:
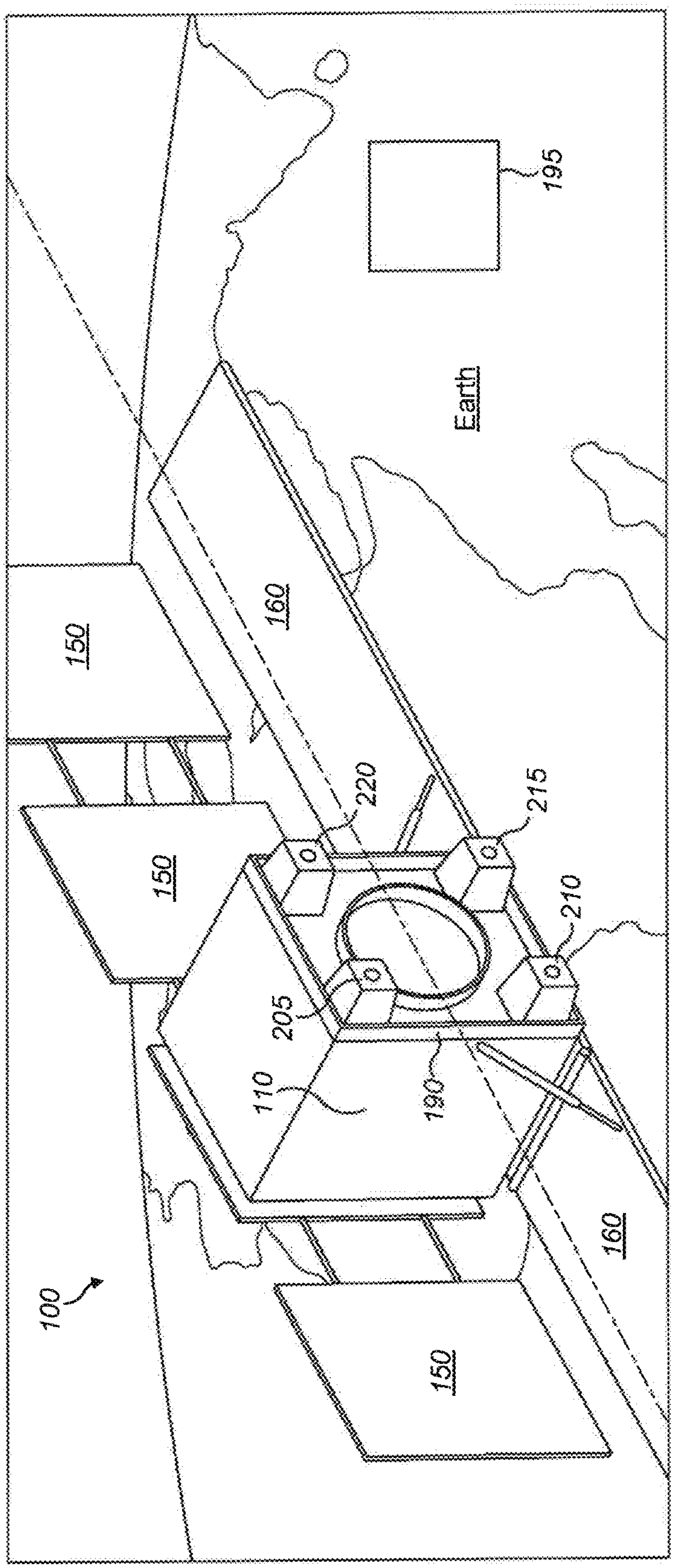
FIG. 1 is a schematic perspective view of a satellite in orbit above Earth.

Common reference numerals are used throughout the figures to indicate similar features.

DETAILED DESCRIPTION

Embodiments of the present invention are described below by way of example only. These examples represent the best ways of putting the invention into practice that are currently known to the applicant although they are not the only ways in which this could be achieved.

Some embodiments of the invention provide systems and methods for operating a SAR (Synthetic Aperture Radar) system to obtain images of areas on Earth. For this purpose, a SAR system may be carried on a platform travelling with respect to the surface of Earth. For example, a SAR system is commonly carried onboard satellites. However, the methods and systems described here are not limited to space and may be performed using aircraft or any other suitable platform.

In the following description, the term unambiguous signal will be used to refer to a signal that is acquired from the target image area, also referred to here as the "desired" imaging area. The ambiguous signal will be used to refer to a signal that is acquired from the ambiguous regions outside of the desired imaging area. The ambiguous signal can be mixed in with the unambiguous signal and can cause ambiguities in the resulting images. Ultimately the desire is to obtain an image of the unambiguous region (target image area) with as few ambiguities as possible. According to some of the methods described in this disclosure, this may include a step of obtaining an image of the ambiguous region, referred to in this disclosure as the ambiguous image. This refers to SAR raw data that is focused with the parameters of the ambiguous region in order to obtain an image of that region. The ambiguous image itself can also have value because it provides additional imagery of another area with very little additional cost. Similarly, the nadir signal refers to the signal return from the point directly below the satellite. The nadir is a special case of an ambiguous signal, and an image for the nadir region can also be formed in the process of obtaining an image of the unambiguous region.

FIG. 1 is a perspective view of a satellite 100 in orbit over Earth as an example of a platform which may be used in the methods and systems described here. The satellite comprises a body 110 and "wings" 160. One or more antenna elements may be mounted on the satellite wings. The satellite 100 additionally comprises a propulsion system 190 shown to be mounted on the body 110 on the surface opposite the solar panels 150. The propulsion system comprises thrusters 205, 210, 215, 220, which are generally operated to maintain the satellite 100 in a particular orbit. For example, the thrusters 205, 210, 215, 220 may be used to propel the satellite 100 in a particular direction with respect to the earth. As noted elsewhere, the methods described here are particularly but not exclusively suited to implementation in connection with a SAR carried on a satellite.

The body 110 may house a computing system and control equipment as will be familiar to those skilled in the art. FIG. 1 also shows schematically a ground station computing system 195 configured to post-process the received SAR data. Some of the steps of the methods described here may be implemented at a ground station computing system.

As is known in the art, a SAR system is operated to alternate periodically between a transmission mode in which a pulse of radiation is directed towards the surface of Earth and a reception mode in which radiation reflected from the surface is received.

As is also known in the art, to create a SAR image, successive pulses of radio waves are transmitted to "illuminate" a target area, and the echo of each pulse is received and recorded. The pulses can be transmitted, and the echoes can be received, using a single beam-forming antenna. As the SAR is carried on board a moving platform, such as a satellite, and therefore moves with respect to the target, the antenna location relative to the target changes with time and the frequency of received signals changes due to the Doppler effect. Signal processing of the successive recorded radar echoes allows for the combination of recordings from multiple antenna positions, thereby forming a synthetic aperture antenna (SAR) to allow creation of high resolution images.

An area being imaged by the SAR is known as a footprint. A direction along the flight direction of the SAR is usually referred to as the azimuth or along-track direction. A direction transverse to the flight direction is usually referred to as the range, elevation, or cross-track direction. A direction opposite to the flight direction corresponds to the backward azimuth direction.

Figure 2:
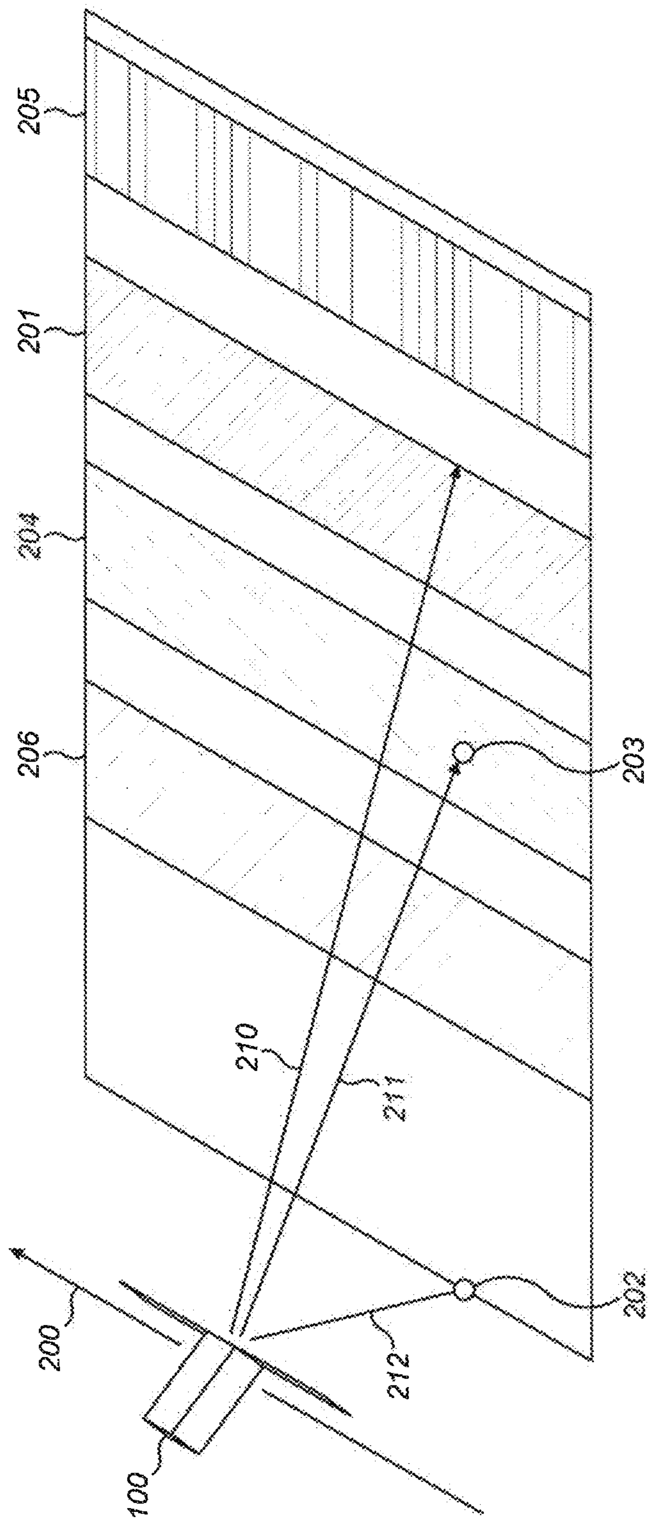
FIG. 2 is a schematic illustration of a satellite operating in space, an area to be imaged, the nadir point and several ambiguous areas.

Referring to FIG. 2, a satellite 100 is shown travelling along a flight track 200 in the azimuth direction. The satellite is operating in a "side-scan" mode where the area to be imaged is off to the side of the flight path of the satellite rather than directly underneath it. This is typical for SAR satellites since the bright return due to specular reflections from objects directly underneath the satellite make it difficult to form an image of the nadir region. The shaded region 201 represents an area to be imaged (unambiguous region). Point 202 is the nadir point, or the point directly under the satellite. Regions 204, 205, and 206 are ambiguous regions from which radar returns due to lobes in the radar beam can cause ambiguities in the SAR image. Point 203 is a point in an ambiguous region 204, which is next to the unambiguous region 201 for which an image is desired. FIG. 2 shows the satellite 100 operating in a classic strip map mode, where the SAR beam is swept along one swath along the ground as the satellite travels in its orbital path. However, examples according to the current disclosure can be equally applied to any SAR mode, including for example spotlight mode, ScanSAR (Scanning Synthetic Aperture Radar) mode, and TOPSAR (Terrain Observation with Progressive Scans SAR) mode. The collected SAR data typically comprises echo signals from the unambiguous region, ambiguous regions, and the nadir which, respectively, correspond to the unambiguous image, ambiguous image, and a the nadir image.

In an example according to the current disclosure, an improved waveform sequence and method of using waveform diversity is described. In an example, the waveform coding for up/down chirps (UDC) and azimuth phase encoding (APC) are applied together to suppress both nadir returns and ambiguities arising from zones proximate to the desired imaging area in order to produce an improved SAR image.

For UDC, rather than transmitting radar pulses with a single frequency, the frequency of each pulse is either swept up or down over the duration of the pulse, creating either an "up chirp" or a "down chirp". The transmitted signal by the satellite 100, neglecting the initial phase and power terms, can be written as follows:

$$st_U = \exp\left(j\pi\alpha t^2\right) rect\left[\frac{t}{T_p}\right] \tag{1}$$

$$st_D = \exp\left(-j\pi\alpha t^2\right) rect\left[\frac{t}{T_p}\right] \tag{2}$$

Where $st_u$ and $st_d$, respectively, represent the transmitted signals with an up chirp and a down chirp, α is the chirp rate, t is the fast time (or time along the range direction), Tp is the pulse width and rect is the rectangle function.

The return echoes will carry either the up or down "signature" thereby indicating whether the return is from a transmitted pulse that has an up-chirp or one that has a down-chirp. For example, an up chirp is transmitted to the imaging area in question. Given the distance to the imaging area and the speed of light, the time at which the return echoes from that area would be expected is known. However, there may be some returns from other closer or further areas that are mixed in with the returns from the desired imaging area. For example, the Nadir is much closer so returns from later transmitted pulses could show up along with the pulses that have travelled to the imaging area and back. This is an example of an ambiguity. By carefully selecting the sequence of up and down chirps so that the unambiguous image returns are for example all up chirps while the nadir returns are down chirps for a given point in time, it is then possible to filter out the nadir return using a matched filter.

The matched filter output of the down chirp with the reference signal of up chirp is:

$$r(t) = \frac{1}{\sqrt{2}}\left[rect\left(\frac{1}{2T_p}\right)\right]\exp\left(-j\pi\frac{\alpha}{2}t^2\right) \tag{3}$$

The opposite case (matched filter output of the up chirp with the reference signal of down chirp) has an opposite phase sign inside the exponential. Therefore, the focusing according to the unambiguous reference signal makes the ambiguous signal unfocused with twice the pulse (2Tp) width and half the chirp rate (α/2) as compared to the transmitted signals (1) and (2). Mathematically, the focusing here is a convolution of the conjugate of the transmitted signal with the received signal. Note that although chirps or pulses with linear frequency sweeps either up or down are described by way of an example, other types of frequency sweeps can be used in the same manner according to current disclosure. Other examples of frequency modifications that can be used to identify pulses include but are not limited to non-linear frequency sweeps, triangular frequency sweeps, parabolic frequency sweeps, or cyclic frequency sweeps.

Figure 3A:
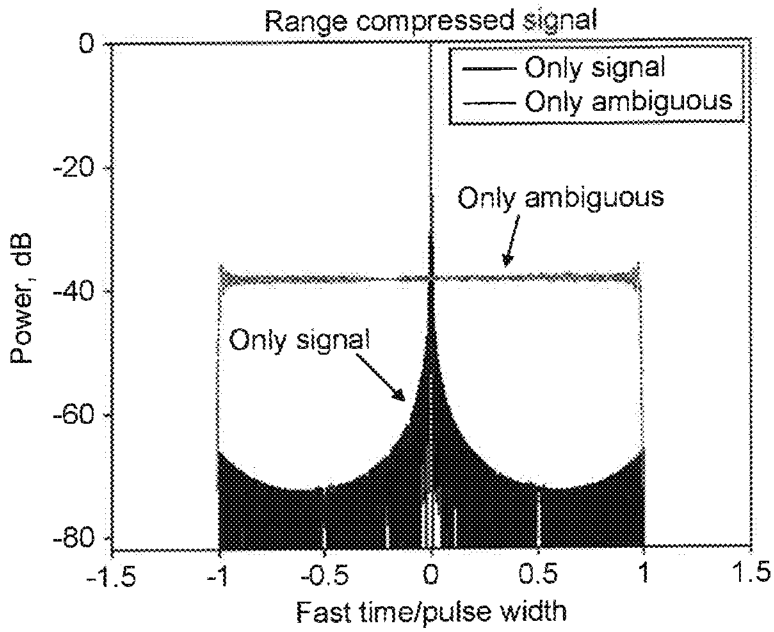
FIG. 3*a* is a plot of range compressed data for an unambiguous point target and a point target in the ambiguous region.
Figure 3B:
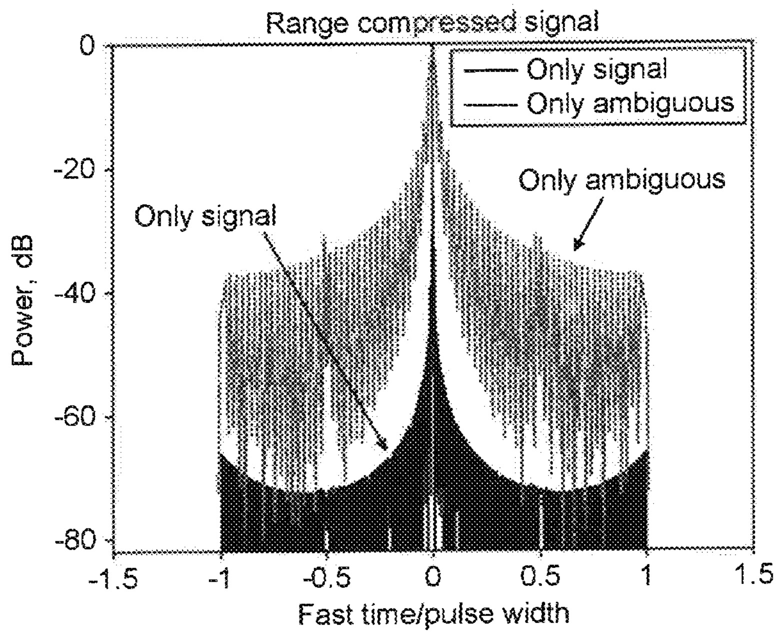
FIG. 3*b* is a plot of range compressed data for an unambiguous point target and an extended target in the ambiguous region.

FIG. 3*a* shows a plot of a simulated matched filter output of the unambiguous point target compared with the ambiguous point target, where the transmitted waveform is UDC encoded. FIG. 3*b* shows the same unambiguous point target output with an ambiguous extended target (80 m long target with point targets at each range sampling spacing). The simulation parameters are given in Table 1 below. It is seen that UDC waveform can suppress the point targets by smearing the energy. However, if the target backscattering is strong enough, one may expect range stripes to appear in the image. For the extended target case, and depending on the size of the target, it can be seen in 3b that UDC may not help to significantly reduce the ambiguous signal. Further modification to the waveform is proposed to address this issue, as described below.

TABLE 1

| Parameter Name | Value | Unit |
|---|---|---|
| Chirp Bandwidth | 116 | MHz |
| Sampling Rate | 137 | MHz |
| Pulse width | 33 | us |
| Slant range to first pixel | 687.7 | km |
| Incidence Angle | >35 | Degree |
| PRF | 4000 | Degree |

In an example according to the current disclosure, UDC is combined with Azimuth Phase Coding (APC) to better reduce ambiguities arising from the nadir as well as from ambiguous zones close to the desired imaging area, and in particular from the extended targets as described above. The principle idea of APC is to shift the Doppler spectra of ambiguities arising from the range-ambiguous regions so they can be mitigated during a SAR focusing operation. However, recall that applying APC on its own can have limitations such as narrower swath widths or degraded azimuth resolution.

In the following, methods are described in which an ambiguity index is calculated for the nadir of the platform, and a frequency sweep direction sequence is determined based on this nadir ambiguity index. The waveform is then encoded with the determined frequency sweep direction sequence and a relative phase sequence (APC) for successive pulses of the waveform.

The nadir ambiguity index may be a positive or negative integer. In other words, different frequency sweep direction sequences or UDC sequences are applied based on a first ambiguity index being the ambiguity index of the nadir return.

Additionally, different relative phase sequences or APC sequences may be applied based on a second ambiguity index, for example the ambiguity index of the ambiguous region with the strongest return (other than the nadir). Since the ambiguous region with ambiguity index equal to one is typically the strongest return, this is may be used as the second ambiguity index.

This method of creating waveform diversity can be used to reduce ambiguities from both the nadir return and from ambiguous zones close to the desired imaging area. If the nadir region is out of the range of the radar echo returns, both the UDC and APC portion of the waveform can be selected based on the ambiguity index of the ambiguous region expected to have the strongest radar echoes, referred to here as the range ambiguity index.

The determination of frequency sweep direction sequence may comprise selecting a frequency sweep direction sequence from a plurality of frequency sweep direction sequences.

The ambiguity index, for the nadir or any other region, may depend on one or more of slant range, estimated distance from the platform to an ambiguous point, and pulse repetition rate of the waveform.

The ambiguity index, for an ambiguous point assuming a flat Earth, can be expressed as:

$$N_{amb} = \left\lfloor \frac{R - R_n}{c/2PRI} \right\rfloor \tag{4}$$

where R is the slant range to the far extent of the planned scene or target area to be imaged (i.e., the unambiguous region), $R_n$ is the estimated range to the ambiguous point, c is the speed of light, PRI is the pulse repetition interval and $\lfloor\ \rfloor$ is the floor operator. The ambiguity index may be an integer, and/or can be positive or negative.

An ambiguity index can be calculated for the nadir and for any point in any other ambiguous region. With reference to FIG. 2, line 210 represents the distance to the far extent of the unambiguous area to be imaged (area 201) and is R for this example. Point 203 is a point in an ambiguous zone 204 outside of the area to be imaged 201. $R_n$ for point 203 is the distance represented by line 211. In an example, the ambiguity index for point 203 is one. In fact, all points falling in ambiguous area 204 would have an ambiguity index of 1. The ambiguity index is indicative of the order of the range ambiguity. The strongest ambiguities will typically be those arising from the nadir point 202. Since ambiguous area 204 is the closest zone to the unambiguous area 201, points with ambiguity index one are most likely (but not always) to give rise to the next strongest ambiguity signals. In this example, points in ambiguous area 205 would have an ambiguity index of −1. Points in ambiguous area 206 would have an ambiguity index of 2. In the case of the nadir point 202, the estimated range $R_n$ would simply be the height of the satellite above ground, as indicated by the distance represented by line 212. In the below, the symbol $N_{nadir}$ is used to denote the nadir ambiguity index and $N_{range}$ is used to denote the ambiguity index of points in other ambiguous regions. The ambiguity index of the nadir point 202 will depend on the scene geometry, the distance represented by line 210 to the area to be imaged, and the distance from the satellite 100 to the nadir point 202, which is equivalent to the height of the satellite above the ground.

It is noted that $N_{amb}$ of a particular point depends on the location of the area being imaged and can be different for different image acquisitions. For example, if ambiguous zone 206 were in fact the area to be imaged, the ambiguity index of the nadir point 202 would be lower than in the example where area 201 is the area to be imaged. The ambiguity index of a point at a fixed distance from the satellite may change multiple times during the course of one orbit because a satellite may be tasked at different parts of the orbit to image areas that are closer or farther away from the flight track 200. Intuitively, $N_{amb}$ can be thought of as indicating the spatial order of the ambiguous region from the unambiguous region. The further away the ambiguous region is from the unambiguous region, the higher the $N_{amb}$ of that ambiguous region. It will be appreciated that the values of R and $R_n$ will also depend on the satellite configuration and mission planning. For example, the antenna pattern in elevation may dominate the received signal power more than the distance to the target does. Hence, as previously mentioned, the strongest ambiguity from an ambiguous region other than nadir is typically the first (positive) number of ambiguity with range ambiguity index $N_{range}=1$. For this region the antenna gain is higher than for other ambiguous regions, even though some other ambiguous regions are close to the SAR platform. Since the ambiguities from ambiguous regions are mostly sourced form $N_{range}=1$, in some embodiments of the present invention the waveform diversity is set according to the fixed range ambiguity index ($N_{range}=1$), and varying nadir ambiguity index $N_{nadir}$. In the latter case, $R_n$ in equation 4 becomes the estimated range to the nadir point.

As will be shown below in an example, encoding the waveform with both UDC and APC can act to suppress both the nadir return and the returns of other ambiguous regions. The nadir scattering is a bright target that falls within a couple of pixels in the SAR image. As a result, nadir can be defined as a point target (in range direction) and UDC can be used to suppress it successfully. The remaining ambiguities from the range ambiguous regions can be suppressed with APC.

In Table 2, three different waveform sequences combining UDC with APC are defined for different values of $N_{nadir}$ (first column) and odd $N_{range}$ (second column). In these sequences, the UDC sequence is defined to suppress the nadir ambiguity while APC is defined to suppress the ambiguities from the range ambiguous regions. The ambiguity index is limited to 5 but can readily be increased with the same rationale.

TABLE 2

| Nadir No | Range Amb No | Waveform Sequence |
|---|---|---|
| Odd | Odd | U, D, U + π, D + π, . . . |
| 1 | Odd | U, U, D + π, D + π, . . . |
| 4 | Odd | U, U, U + π, U + π, D, D, D + π, D + π . . . |

In an example, suppose $N_{nadir}$ is calculated to be 4. This means that the received signal is shifted by 4 pulses relative to the transmitted signal. In this case, nadir suppression works well as there is a mismatch in the chirp direction between all the transmitted and received pulses, as shown below in Table 3:

TABLE 3

| | | | | | | | | |
|---|---|---|---|---|---|---|---|---|
| Transmitted pulse chirp & phase | U | U | U (π) | U (π) | D | D | D (π) | D (π) |
| Received pulse chirp & phase of nadir return | D | D | D (π) | D (π) | U | U | U (π) | U (π) |

This means that the Nadir can be suppressed relatively easily. For the range ambiguous region, the strongest returns are usually for the region closest to the region being imaged and to the satellite, which is the range ambiguous region with range ambiguity index 1. In the case of range ambiguity index equal to 1, all the received pulses from the ambiguous region of greatest interest are shifted by one relative to the transmitted pulse as follows:

TABLE 4

| | | | | | | | | |
|---|---|---|---|---|---|---|---|---|
| Transmitted pulse chirp & phase | U | U | U (π) | U (π) | D | D | D (π) | D (π) |
| Received pulse chirp & phase of range ambiguous return | D (π) | U | U | U (π) | U (π) | D | D | D (π) |

Thus, for the received range ambiguous signal, there are only 2 out of 8 pulses that show a mismatch (U with D, ignoring the phase (π) encodings for now) with the transmitted signal, and 6 pulses are matched (U with D). For this reason, in an example according to the current disclosure, the waveform is further encoded with azimuth phase coding (or APC) by adding a phase shift of O or π to help to reduce the ambiguities from the range ambiguous region. The principal idea of APC is to shift the Doppler spectra of the range ambiguity so that it is mitigated during the SAR focusing operation. In order to shift the Doppler spectra by PRF (pulse repetition frequency)/2, a 0, π, 0, π, 0, π, 0, π, . . . phase difference is required between the transmitted and received pulses. This can be achieved if the transmitted up and down chirps are further modulated with 0, 0, π, π, 0 0, ππ, . . . phase encodings (as is shown above in Table 4) for the case when $N_{range}$ is odd. With phase taken into account, there are now 6 out of 8 mismatches, thereby allowing more of the signal from the odd range ambiguous regions to be identified and removed in post processing. When $N_{range}$ is even and equal to 2, the transmitted pulses can be modified using APC to be 0,0,0, π,0,0,0, π . . . . When $N_{range}$ is equal to 4, the pulse sequence can be modified with 0,0,0,0,0 π,0,π. Thus, in this example $N_{nadir}$ is used to define the UDC pattern of the waveform, and $N_{range}$ the APC pattern of the waveform. The combined waveform allows for suppression of ambiguities from the nadir and from either the odd or even ambiguous regions.

The waveform sequences are not limited to the ones listed above. Other sequences are also possible. For example, for up/down chirp (UDC) direction waveform encoding other frequency direction sequences are possible as follows:

If $N_{nadir}$ is odd the chirp direction sequence can be 'UDUDUDUD . . . ', or 'DUDUDUDU . . . '

If $N_{nadir}$=2 the chirp direction sequence can be 'UUDDUUDD . . . ', or 'DDUUDDUU . . . '

If $N_{nadir}$=4 the chirp direction sequence can be 'UUUUDDDD . . . ', or 'DDDDUUUU . . . ' where 'U' is an 'up chirp' modulation and 'D' is a down chirp modulation. Higher even numbers may be ignored as the power in these ambiguities is usually insignificant. Thus, the determination of frequency sweep direction sequence or UDC may comprise selecting a sequence from a plurality of possible sequences depending on the nadir ambiguity index.

In general, for phase waveform encoding (APC), the phase sequence can be determined with the following formula:

$$\varphi_k = \varphi_{k-N_{amb}} + k\pi + \pi$$

where, $\varphi_k$ is the phase of the $k^{th}$ pulse. Notice in the first $N_{amb}$ phases the starting phase of the waveform can be selected between O or n. For instance:

If $N_{range}$ is odd, the phase coding sequence can be selected as one of these:

'0,0,π, π,0,0, π, π . . . ',

'π, π,0,0, π, π, 0, 0 . . . '

If $N_{range}$ is 2, the phase coding sequence can be selected as one of these:

'0,0,0, π,0,0, 0, π . . . ' and the shifted versions 'π. 0,0,0, π,0,0, 0 . . . ', '0, π. 0,0,0, π,0,0, . . . ' and '0,0,π. 0,0,0, π,0, . . . '

'π, π,π,0, π, π, π, 0 . . . ' and the shifted versions

If $N_{range}$ is 4, the phase coding sequence can be selected as one of these:

'0,0,0,0,0,π,0,π' and the shifted versions

'0,0,π, π,0,π, π, 0' and the shifted versions

'0,π,π, π,0,0,π, 0' and the shifted versions

'π,π,π, π,π,0,π, 0' and the shifted versions

Thus it can be seen that to account for a range ambiguity index other than 1 the determination of relative phase sequence may be made, according to an example, based on whether the range ambiguity index is odd, two, or four. One frequency sweep direction sequence may be used for all instances where $N_{nadir}$ is odd, and a larger set of frequency sweep direction sequences may be available for different even values of $N_{nadir}$. Although shifts of 0 and π are shown, the pulse does not necessarily need to be shifted by π, and other values such as −π/2 and π/2 are possible. Shifting can also be carried out by less than π but the performance in suppressing ambiguities from range ambiguous regions may not be as good.

Examples of U and D pulses were already given in Equations (1) and (2). For the sake of completeness, the definition of U+π and D+π can be given as:

$$st_{U_\pi} = \exp(j\pi\alpha t^2 + j\pi)rect\left[\frac{t}{T_p}\right] \quad (5)$$

$$st_{D_\pi} = \exp(-j\pi\alpha t^2 + j\pi)rect\left[\frac{t}{T_p}\right] \quad (6)$$

After the SAR data is collected, for example by combining UDC and APC with a frequency sweep direction sequence and/or relative phase sequence chosen based on ambiguity index, it can be post-processed to suppress the nadir and range ambiguities.

The received raw echo data will correspond to an unambiguous region, an ambiguous region, and the nadir. The processing may comprise extracting nadir data and the ambiguous data in a dual focussing process.

Figure 4A:
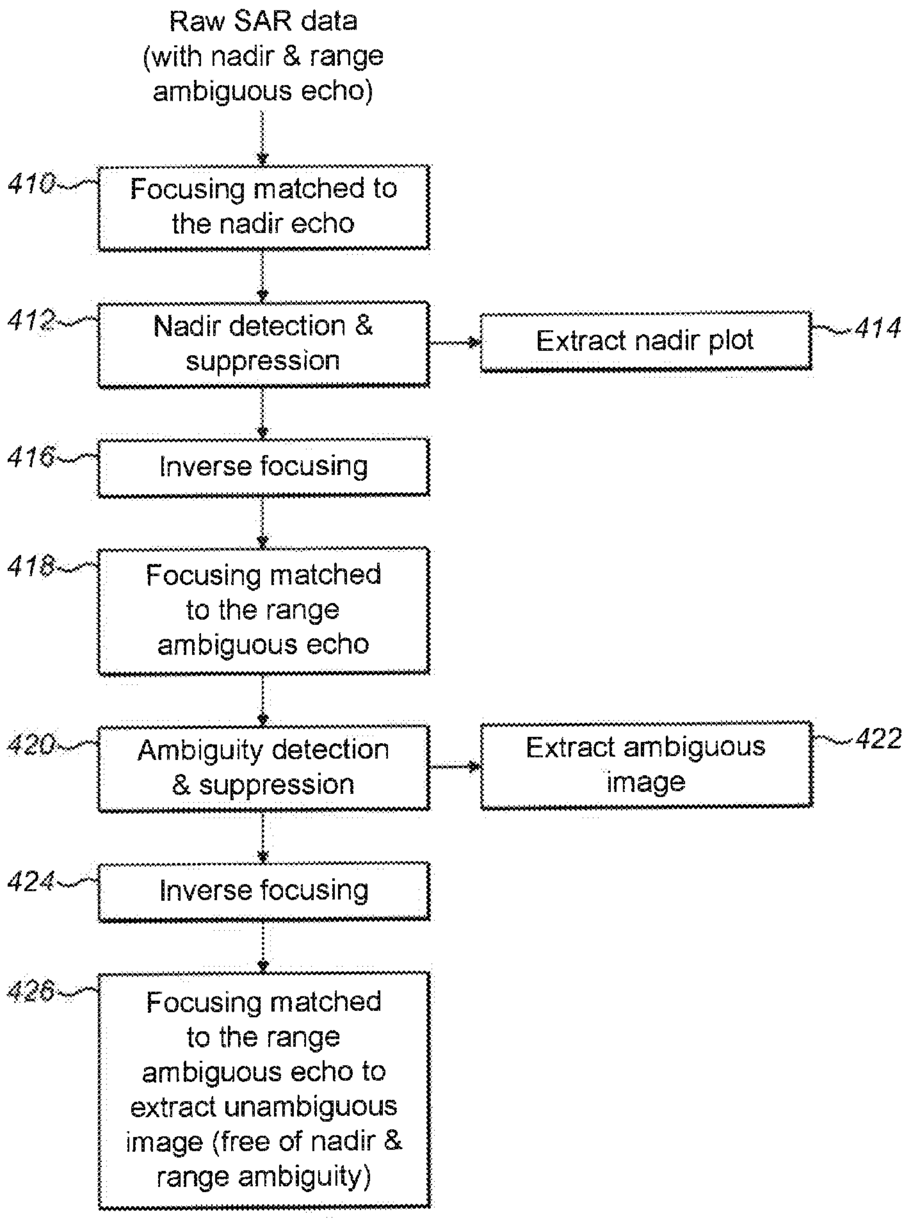
FIG. 4*a* is a flow chart of a method of extracting an unambiguous image from SAR data using a double dual focusing method.
Figure 4B:
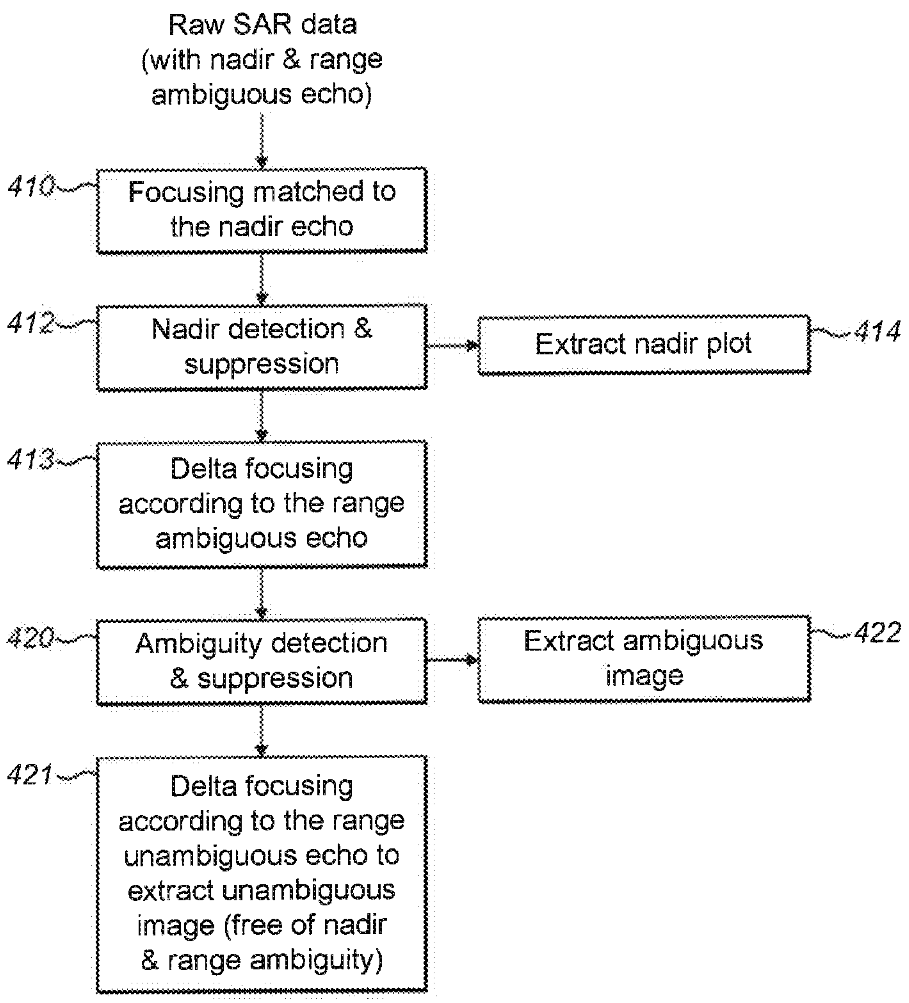
FIG. 4*b* is a flow chart of a method of extracting an unambiguous image from SAR data using a delta focusing method.

An example of two different post processing algorithm flows are presented in FIGS. 4a and 4b. These figures show post-processing methods using dual focussing to remove the nadir ambiguities and ambiguities arising from the range ambiguous regions. In general, SAR data is first processed to detect and suppress the nadir, and then a plot of nadir is extracted. The data is subsequently processed to detect and suppress the ambiguous image and to extract the range ambiguous image. Lastly the SAR image of the unambiguous region is extracted, which after this process is substantially free of or has much reduced nadir ambiguities and ambiguities from other range ambiguous regions.

The methods described here are not limited to the order of operations illustrated. In particular, the extraction of the ambiguous image may take place before the extraction of nadir image, or vice versa.

Figure 5A:
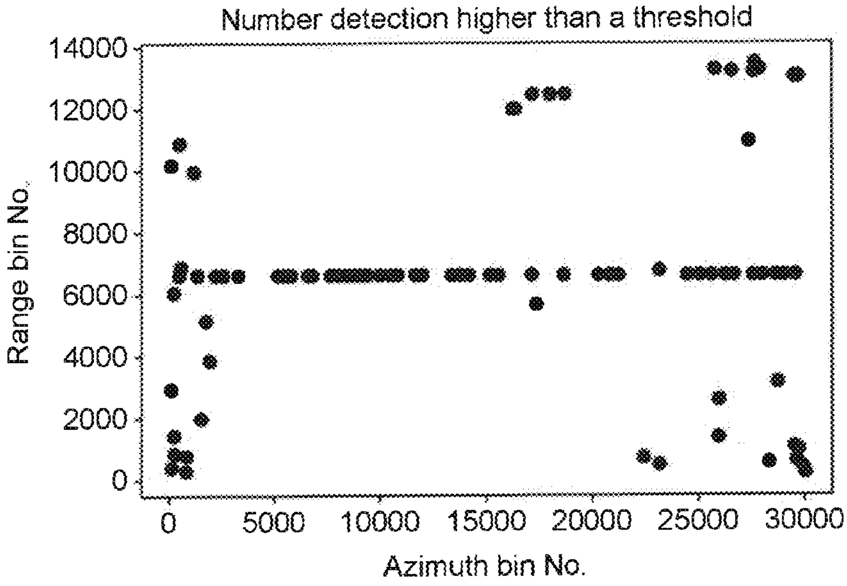
FIG. 5*a* is a plot of detection points extracted by thresholding the ratio of the cell under test to the background for a focused nadir image.
Figure 5B:
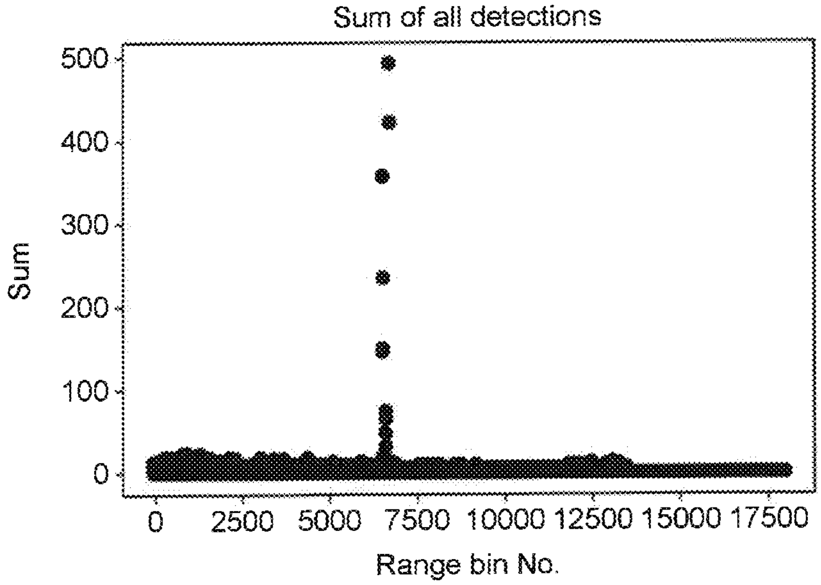
FIG. 5*b* is a plot of the sum of the ratio of the cell under test to the background for each range bin for a focused nadir image.

Concentrating initially on FIG. 4*a*, the input of the algorithm is the SAR raw data, which corresponds to data from nadir, the ambiguous region and the unambiguous region. The first operation 410 is focusing the SAR data according to the nadir echo to obtain a focused image of the nadir. There are two major features of the nadir within an image. First, the signal power is high due to the direct reflection back of the transmitted signal from objects at the nadir. Secondly the range only deviates within a narrow region in azimuth time, and even mostly in the same range bin for successive azimuth bins. At operation 412, the nadir is detected and suppressed. In order to detect the nadir, a range sliding window is applied to extract the ratio of the cell under test to the background. The result is shown in FIG. 5*a*, which shows the detection plots in a nadir focused image. This ratio is summed up for each range bin to detect the nadir as it is presented in FIG. 5*b*. It is clearly seen that nadir range bins are between 6200-6500 while plots outside of this region may be useful signal.

Nadir detection has two advantages: the first is that it is less likely to suppress the useful signal, and the second is that the above-the-ground altitude of the satellite is measured and can be used for radar altimetry purpose. Subsequently, the nadir ambiguity is suppressed by dividing the data with the time bandwidth product. Additionally, a plot of nadir is extracted at operation 414.

At operation 416, the SAR data is inverse focused to extract the raw SAR data (now without the nadir echo). The inverse focusing is achieved by applying the conjugate of the filter that was used for focusing the raw data according to the nadir parameters. A successive application of focusing and inverse focusing is phase and amplitude preserving unless no suppression is performed. The major challenge about this implementation is to preserve the desired signal that is not affected by nadir. To achieve this goal, the focusing and inverse focusing is implemented to process the full bandwidth of the signal. Another challenge is to detect the nadir so that only the nadir affected features are suppressed. The focusing includes the Range Compression (RC), Range Cell Migration Correction (RCMC) and Azimuth Compression (AC). Within this context, RC uses matched filtering and the data with the reference pulse number that is shifted with the range ambiguity index relative to the transmitted pulse. RCMC is implemented as a phase multiplication. Reference function for AC is estimated by using the corresponding range.

At operation 418, the SAR data is focused with a filter matched to the range ambiguous echo. At operation 420, the range ambiguity is detected and supressed. Range ambiguity detection is a problem that has many aspects. The most important feature of range ambiguity is that the power of the signal is sufficiently high such that even the unfocused image of the target appears in the unambiguous image. In this case, an Ordered-Statistic Constant False Alarm Rate (or OS CFAR) method [1] can handle the detection problem. However, OS CFAR may result in false alarms for the regions that the unambiguous targets dominate. A Cell Averaging (CA) CFAR method [2] can decrease the false alarms with the trade-off of increased missed detections. In some embodiments of the present invention, the OS CFAR method is applied. The next step is the CA CFAR method. The energy of an unambiguous target is smeared in range direction while focused for an ambiguous one. As a result, instead of estimating the background within a ring, the background is estimated in the range direction to decrease the false alarms.

At operation 422, the ambiguous image is extracted from the SAR data. The SAR data is then inverse focused again at operation 424, before being focused according to range unambiguous echo at step 426 (using a filter matched to the unambiguous echo signal) to extract an unambiguous image from the SAR data which is free of nadir and range ambiguities. As before, the inverse focusing is achieved by applying the conjugate of the filter that was used for focusing the raw data according to the ambiguous region parameters. A successive application of focusing and inverse focusing is phase and amplitude preserving unless no suppression is performed.

FIG. 4*b* shows an alternative embodiment of the method described above. Instead of dual focusing which includes the inverse focusing and refocusing steps, the method described in FIG. 4*b* replaces these operations with a single focusing operation termed 'delta focusing.' In another words, at operation 413 the SAR data (without nadir) is delta focused according to the ambiguous echo instead of being dual focused. Similarly, at operation 421 the SAR data is delta focused according to the unambiguous echo instead of being dual focused to extract the unambiguous image free of any ambiguities. The basic idea is that after focusing the SAR raw data according to the nadir parameters (operation 410 in both methods), the data is unfocused SAR data with a different configuration for the targets at the ambiguous and/or unambiguous regions, and can be focused with the proper parameters to extract the ambiguous and/or the unambiguous SAR image. As a result, the computational burden is approximately halved using delta focusing. The waveform encoded using UDC and APC is compatible with both post-processing methods (i.e., double dual focusing and delta focusing).

Figure 6A:
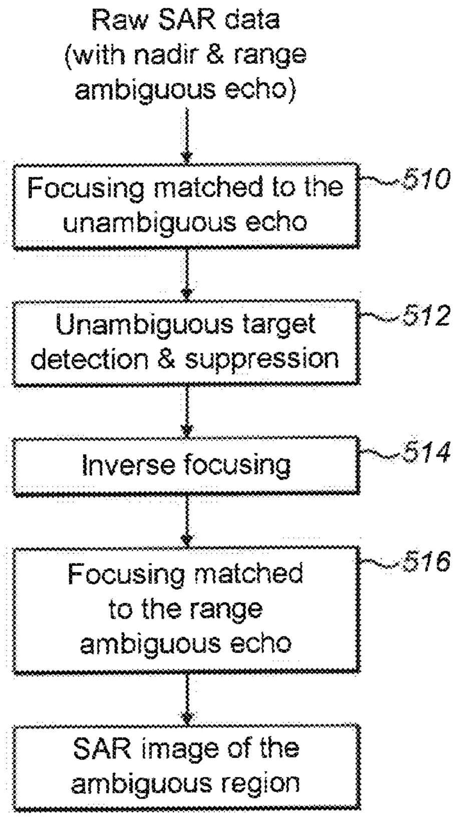
FIG. 6*a* is a flowchart showing an alternative method according to some embodiments of the invention.

FIG. 6*a* is a flowchart showing an alternative method according to some embodiments of the invention. In this case, the raw SAR data is initially focused according to the unambiguous echo signal at operation 510. At operation 512, an unambiguous image in the SAR is detected and suppressed. The SAR data is then inverse focused at operation 514 (now without the unambiguous data), before being focused again according to the ambiguous echo signal at operation 516. This allows the extraction of the ambiguous image from the SAR data.

Figure 6B:
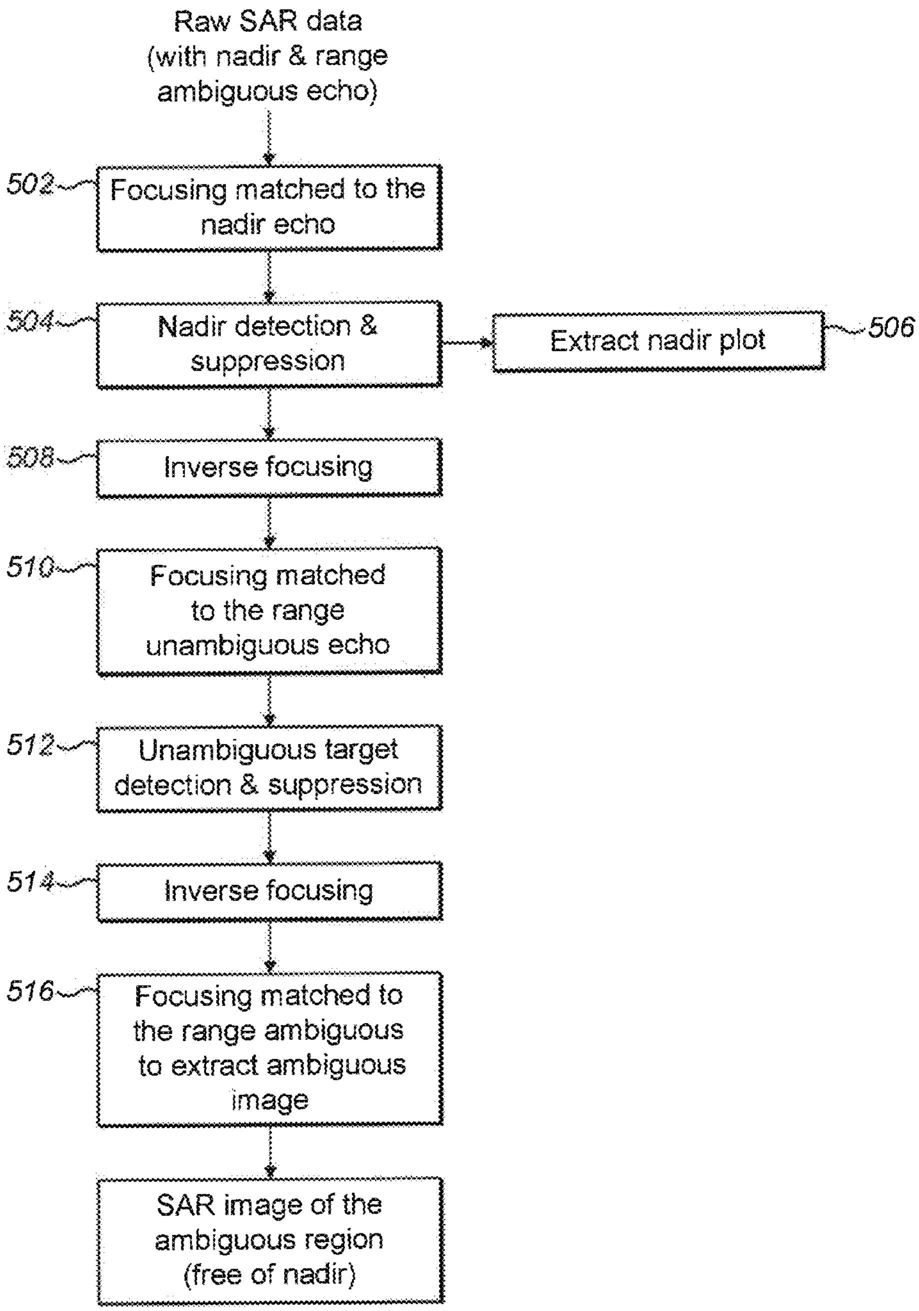
FIG. 6*b* is a flowchart showing another alternative method according to some embodiments of the invention.

FIG. 6*b* is a flowchart showing another alternative method according to some embodiments of the invention. Here, the raw SAR data is initially processed to remove the nadir from the SAR data, and to obtain a plot of the nadir (operations 502-506), before being inverse focused at operation 508. Subsequently, the operations 510-516 identical to those shown in FIG. 6*a* are performed to obtain an ambiguous image from the SAR data, but which is now free of nadir. As before, in another embodiment, the operations of inverse focusing 508 and focusing 510 in FIG. 6*b* can be replaced by a single delta focusing operation for computational efficiency. With both process 6*a* and 6*b*, being able to extract an image of the ambiguous region is an added and unexpected advantage of the disclosed method. The image of the ambiguous region provides additional imaging of a wider area that can prove useful for end users of the SAR data.

Figure 7:
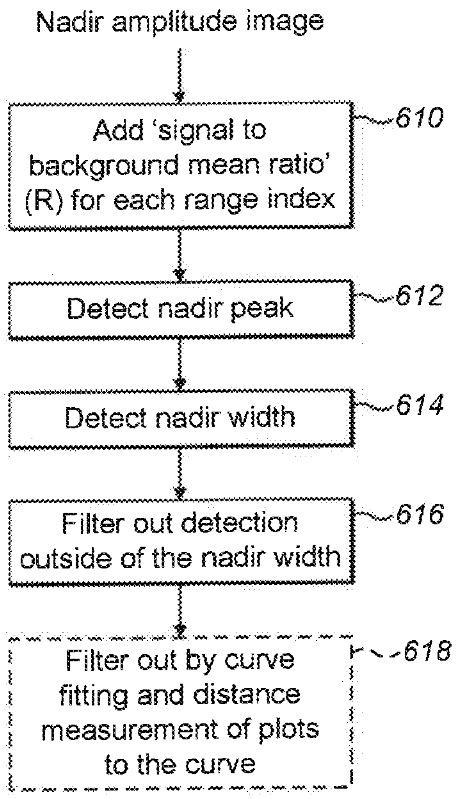
FIG. 7 is a flowchart showing a method for detecting nadir in the SAR data according to some embodiments of the invention.

FIG. 7 is a flowchart showing a method for detecting nadir in the SAR data using CA CFAR. The first task is to determine the number of guard and background cells, as well as the desired false alarm rate. The guard cells are placed adjacent to the Cell Under Test (CUT), both leading and lagging it. The purpose of these guard cells is to avoid signal (nadir) components from leaking into the background cells, which could affect accuracy of the noise estimate. In some embodiments of the present invention, the number of guard and background cells are set to 5 and 15, respectively, and the desired false alarm rate is set to 0.001. However, it can be appreciated that these values can vary depending on the specific requirements of the method. After focusing the SAR data according to nadir (operation 410 in FIGS. 4*a* and 4*b*), at operation 610 a signal to background mean ratio 'R' is added for each range index. At operation 612, the nadir peak is detected, and a width of the nadir is detected at operation 614. The nadir start (N1) and end (N2) indexes with reference to nadir peak index are detected using the function shown in Equation 7:

$$\text{argmax}_{N_1,N_2}\left(\frac{\frac{1}{N_2-N_1+1}\sum_{i=N_1}^{N_2}S[k_{max}+i]}{\frac{1}{N_{max}/2+N_1}\sum_{i=-N_{max}/2}^{N_1-1}S[k_{max}+i]+\frac{1}{N_{max}/2-N_2}\sum_{i=N_2+1}^{N_{max}/2}S[k_{max}+i]}\right) \tag{7}$$

where $N_{max}$ is the maximum acceptable Nadir that is a function of slant range spacing and the maximum slope of the Earth assumption, $k_{max}$ is the nadir return peak index, and S is the signal array calculated at operation 610 and is a function of the range index K. The argmax function returns a value of $N_1$ and $N_2$ that maximizes the function inside the brackets. $N_1$ is a negative integer value within $(-N_{max}/2+1, k_{max}-1)$ and $N_2$ is a positive integer number within $(k_{max}+1, N_{max}/2-1)$. At operation 616, the method filters out any detection that is outside the nadir margin width $(k_{max}+N_1, N_{max}+N_2)$. Operation 618 is optional (as indicated by the dotted box) and involves curve fitting and distance measurement of the plots to the curve.

Additionally, as mentioned previously, both the OS CFAR and CA FAR are applied to detect the range ambiguity. In some embodiments of the present invention, for the OS CFAR, the desired false alarm rate is set at 0.001, and the noise power is estimated based on selection of the $N^{th}$ largest cell, where N is ¾ multiplied by the number of SAR data samples. For the CA CFAR that is subsequently applied, the desired false alarm rate is the same as OS CFAR, but the number of guard cells is set to 1000, background cells at $N_{chirp}-1000$, where $N_{chirp}$ is the pulse width×sampling rate.

The algorithm for the aforementioned methods is derived below for a low squint case, but can be extended to the more general case. The baseband received signal for the unambiguous target can be approximated by:

$$s_0(t,\eta)=A_0\omega_r\left(t-\frac{2R(\eta)}{c}\right)\omega_a(\eta-\eta_c)\exp\left(-j\frac{4\pi R_0}{\lambda}\right)\exp(-j\pi K_a\eta^2)\exp(j\pi\alpha t^2)rect\left[\frac{t-\frac{2R(\eta)}{c}}{T_p}\right] \tag{7}$$

where $\omega_r$ and $\omega_a$ represent the antenna pattern in azimuth and elevation. Respectively, $A_0$ is the amplitude of the signal, n is the slow (or azimuth) time, $K_a$ is the azimuth pulse rate, $R(\pi)$ is the range to the target, $R_0$ is the minimum range to the target, and $\lambda$ is the wavelength.

The first operation 410 of focusing according to the ambiguous pulse rate doubles the pulse width while halving the pulse rate for the unambiguous signal. After range compression and Fourier Transform in azimuth direction, Range Doppler data can be expressed as:

$$s_{rc}(t,f_\eta)=A_0A_1\omega_r\left(t-\frac{2R(f_\eta)}{c}\right)\omega_a(f_\eta-f_{\eta c})\exp\left(-j\frac{4\pi R_0}{\lambda}\right)\exp\left(-j\pi\frac{f_\eta^2}{K_a}\right)\exp\left(j\pi\frac{\alpha}{2}t^2\right)rect\left[\frac{t-\frac{2R(f_\eta)}{c}}{2T_p}\right] \tag{8}$$

The Range Cell Migration (RCM) term in the range envelope is expressed according to the nadir distance:

$$\begin{aligned}\Delta R(f_\eta,R_n)&=\frac{\lambda^2R_nf_\eta^2}{8v_r^2}\\&=\Delta R(f_\eta,R_0)\Delta R\left(f_\eta,-N_{amb}*\frac{c}{2PRF}\right)\end{aligned} \tag{9}$$

The RCM can be corrected in Range Fourier Domain with a linear phase multiplication:

$$G_{rcmc}(f_t)=\exp\left(j\frac{4\pi f_t}{c}\Delta R(f_\eta,R_n)\right) \tag{10}$$

After RCMC the signal can be written as follows:

$$s_{rcmc}(t,f_\eta)=A_0A_1\omega_r\left(t-\frac{2\Delta R\left(f_{\eta'}-N_{amb}*\frac{c}{2PRF}\right)}{c}\right)\omega_a(f_\eta-f_{\eta c})\exp\left(-j\frac{4\pi R_0}{\lambda}\right)\exp\left(-j\pi\frac{f_\eta^2}{K_a}\right)\exp\left(j\pi\frac{\alpha}{2}t^2\right)rect\left[\frac{t-\frac{2R(f_\eta)}{c}}{2T_p}\right] \tag{11}$$

The last step is the azimuth compression with respect to the nadir range. In this case, the azimuth pulse rate can be expressed as:

$$K_{a,N_{amb}}=K_a\frac{R_0}{R_0-N_{amb}*\frac{c}{2PRF}} \tag{12}$$

Finally, the extracted image of an unambiguous target after azimuth compression can be written as:

$$s_{im,amb}(t,\eta)=A_0A_1\omega_r\left(t-\frac{2\Delta R\left(R0,_{-N_{amb}}*\frac{c}{2PRF}\right)}{c}\right) \tag{13}$$

-continued $$\omega_a(\eta-\eta_c)\exp\left(-j\frac{4\pi R_0}{\lambda}\right)$$

$$\exp\left(-j\pi K_a\frac{2R_0PRF}{cN_{amb}}t^2\right)\exp\left(j\pi\frac{\alpha}{2}t^2\right)$$

$$rect\left[\frac{t-\frac{2R(f_\eta)}{c}}{2T_p}\right]$$

As a result, the signal after focussing according to the parameters corresponding to the ambiguous region is SAR raw data that can be considered as having been collected with a different configuration, and the signal no longer needs to be defocused and then refocused, but instead can be directly focused to extract the unambiguous image.

Figure 8D:
FIG. 8*d* is a SAR image after post-processing with both nadir and range ambiguity fully suppressed.
Figure 8C:
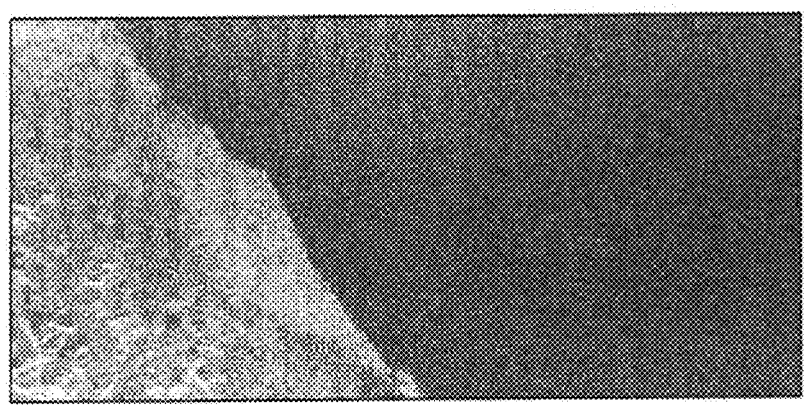
FIG. 8*c* is a SAR image after post-processing with nadir fully suppressed.

To verify the proposed range ambiguity suppression method, a series of SAR acquisitions were performed by using SAR satellites made by ICEYE Oy of Espoo, Finland. The imaged scene includes a calm water surface that is expected to coincide with a strong nadir echo, an ambiguous region return, and a mountainous area with strong scatterers, as illustrated in FIG. 8*a*. The SAR image shown in FIG. 8*a* is collected with waveform diversity using a combination of UDC and APC as described in the current disclosure, but has not been post-processed yet to remove the ambiguities from the nadir and the other ambiguous regions. The mission planning was done to obtain a nadir line at nearly the middle of the swath. Incidence angle was selected as 37.3 degree to guarantee observation of an exaggerated ambiguity from a range ambiguous region. In the image shown in FIG. 8*a*, it is clear that the unambiguous signal, nadir and ambiguous signal are all included within the SAR data. In this example, the ambiguity index number of the nadir is 5.

Figure 8B:
FIG. 8*b* is a SAR image showing the nadir return smeared in the range direction.
Figure 8A:
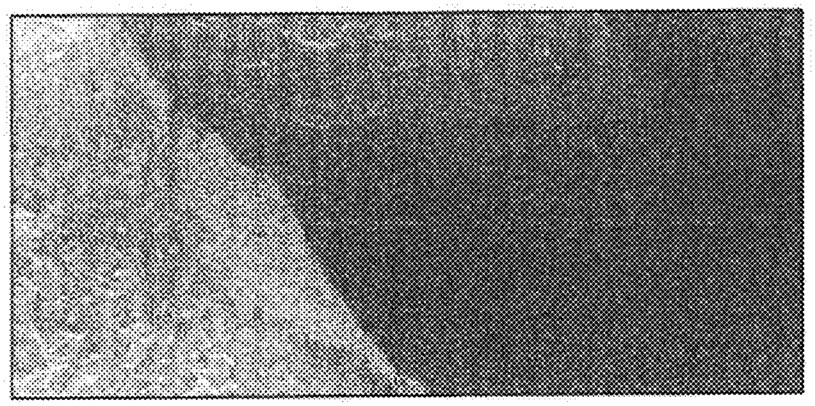
FIG. 8*a* is SAR image showing a strong nadir echo, an ambiguous region return, and a mountainous area with strong scatterers.

FIG. 8*b* shows the same SAR image with some processing to suppress the nadir reflection and the ambiguities from the range ambiguous regions. It can be seen that nadir reflection and the range ambiguity are substantially suppressed. However, at the middle of the image, there are range stripes that coincides with the nadir return and at the right of the image there are stripes that coincides with the strong range ambiguity return.

Figure 9A:
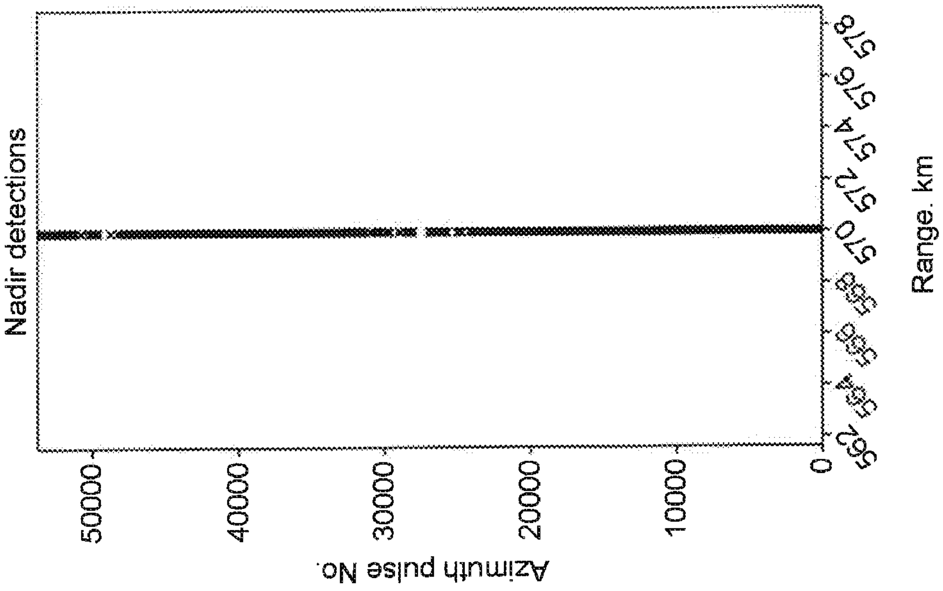
FIG. 9*a* is a plot showing the detection of nadir from a SAR image collected with waveform diversity.

Further post processing is applied to suppress the residual range stripes. Firstly, the nadir is detected as it is presented in FIG. 9*a*. The estimated nadir was 570005.8 m, which is very close to the actual measured value. The strong scatterers labelled as nadir are suppressed by simply dividing the sample to the time-bandwidth product. The nadir free raw data is then focused to extract the unambiguous image. In FIG. 8*c*, the result of both the waveform diversity and the post processing are presented. It is clear that the range stripes at the middle of the image are related with nadir and are now fully suppressed.

Figure 9B:
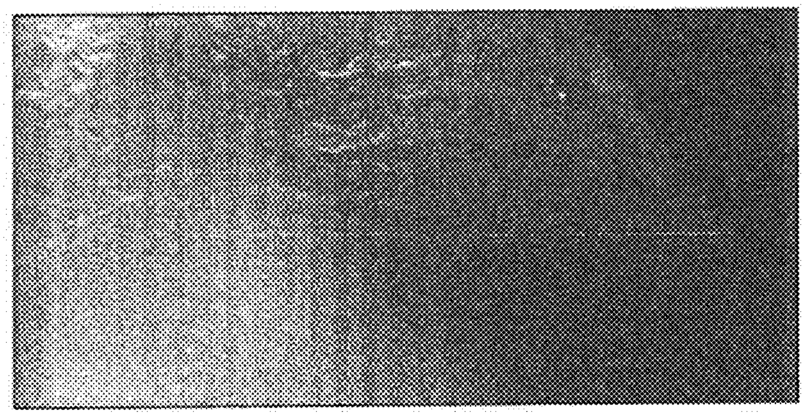
FIG. 9*b* is an ambiguous image of SAR data collected with waveform diversity.
Figure 9C:
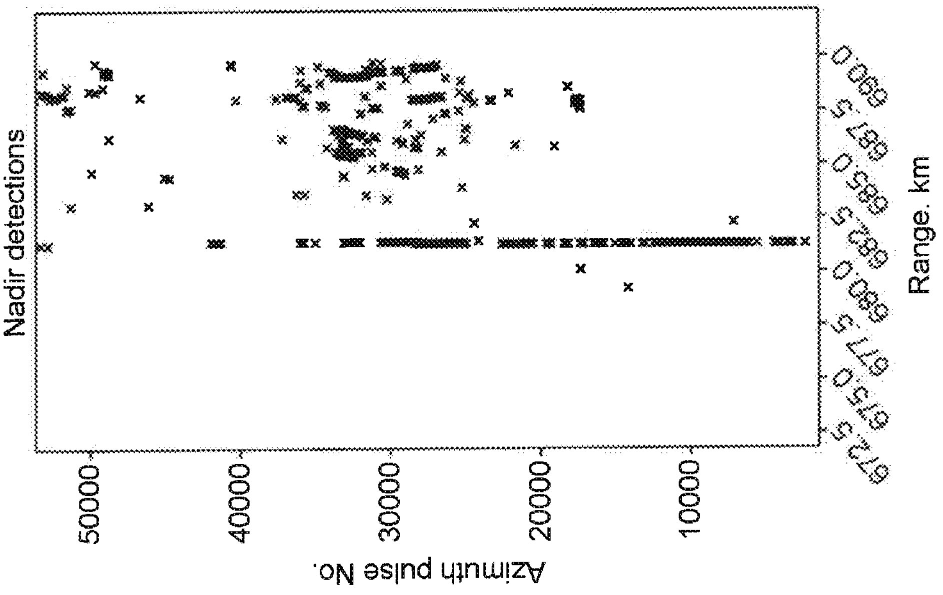
FIG. 9*c* is a plot showing the detection of ambiguities from a range ambiguous region from a SAR image collected with waveform diversity.

The next operation is to detect and suppress the range ambiguity. The ambiguous image is presented in FIG. 9*b* and range ambiguity detection in FIG. 9*c*. Comparing the strong scatterers in the ambiguous image with the detection, it is observed that the algorithm performs quite well at detecting the targets in the range ambiguous region while not detecting the scatterers as targets in the unambiguous region. Another observation is that although the nadir was suppressed successfully in the previous operation, there is still a remaining part of the nadir that is not needed to be suppressed. This part can be filtered out using the nadir information extracted in the previous operation.

Figure 10C:
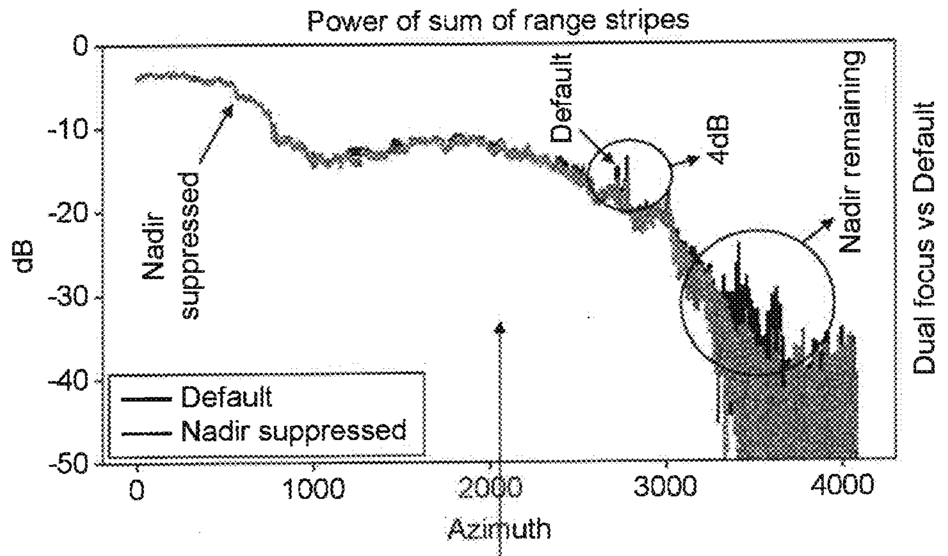
FIG. 10*c* is a plot of the sum of the energy in the range direction vs azimuth for the right section of FIG. 10*a* compared a default image.
Figure 10A:
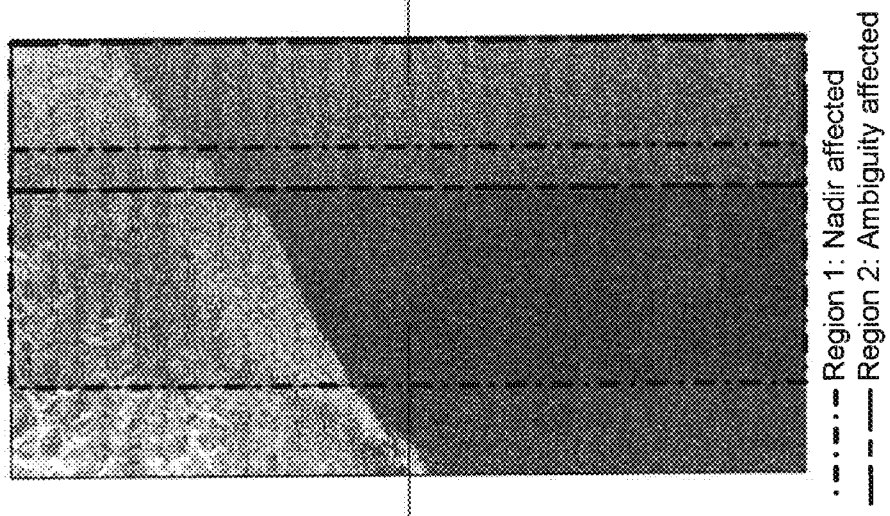
FIG. 10*a* is SAR image collected with waveform diversity and with range stripes.
Figure 10B:
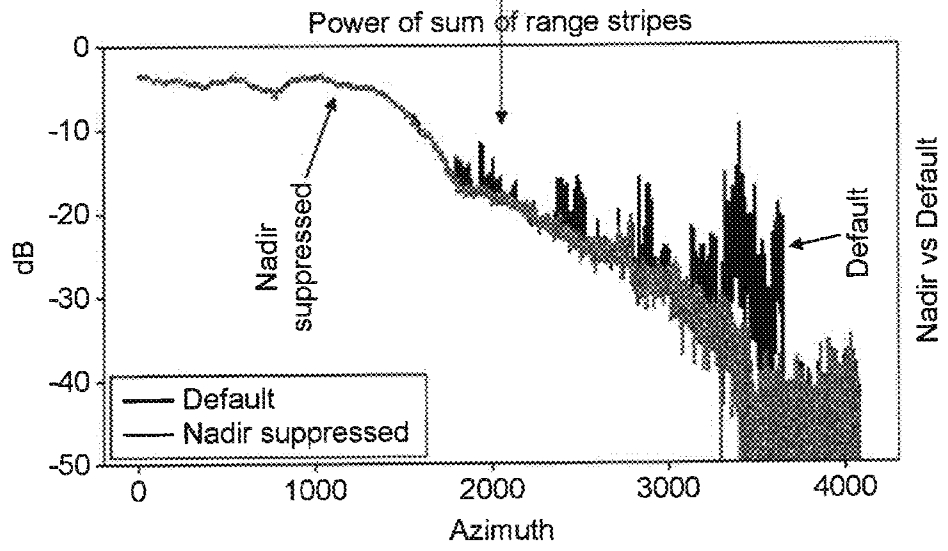
FIG. 10*b* is a plot of the sum of the energy in the range direction vs azimuth for the middle section of FIG. 10*a* compared to a default image.
Figures 11A, 11B, 11C, 11D:
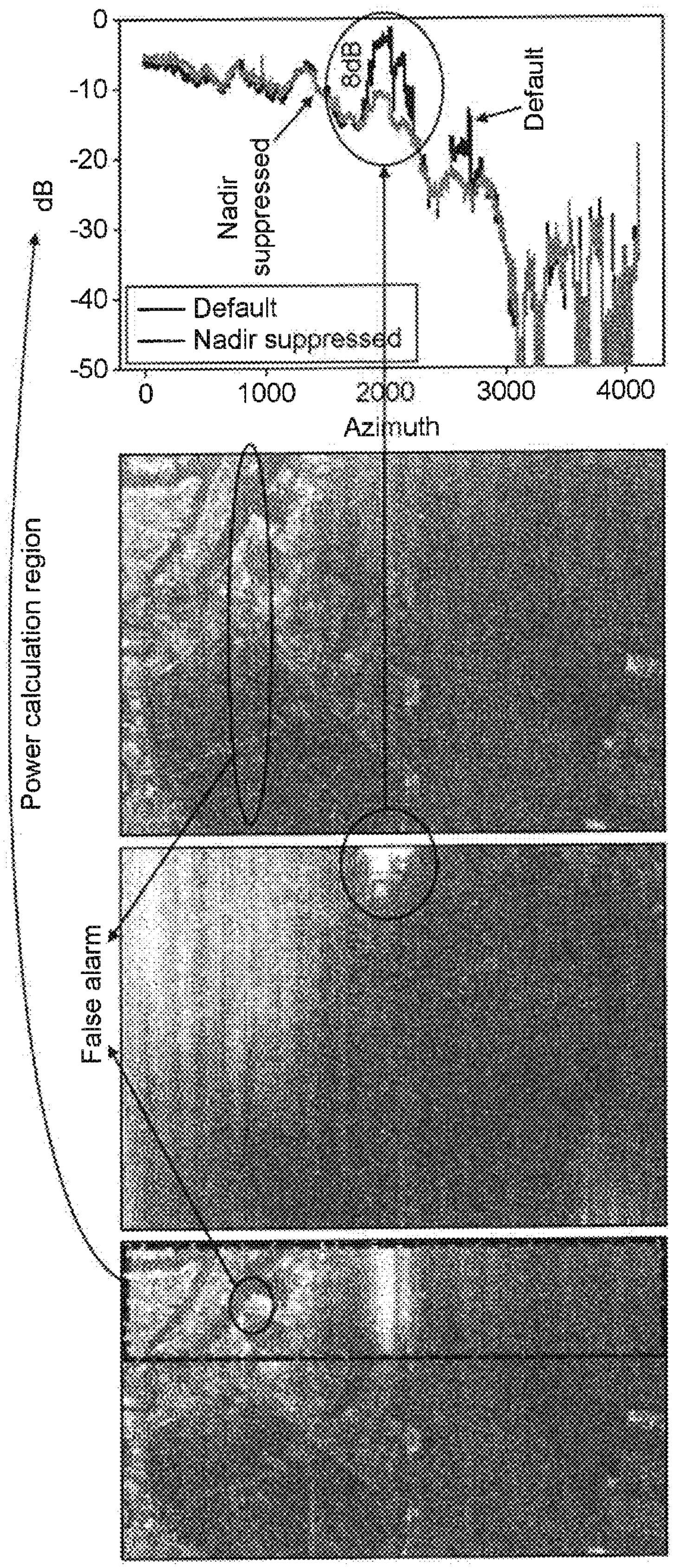
FIG. 11*a* is a SAR image with a high incidence angle and a high pulse repetition rate showing ambiguities arising from an ambiguous region.
FIG. 11*b* is an ambiguous image of the SAR image of FIG. 11*a* and without range ambiguity suppression.
FIG. 11*c* is an unambiguous SAR image of the image of FIG. 11*a* and without range ambiguity.
FIG. 11*d* is a plot of the comparison of the sum of the energy in the range direction versus azimuth compared to the default image of FIG. 11*a*.

After detection and suppression of the range ambiguity, the SAR image is extracted and shown in FIG. 8*d*. It can be seen qualitatively that the ambiguities arising from the nadir and from the range ambiguous regions have been successfully removed. Quantifying the range ambiguity suppression performance is unfortunately not totally straightforward. FIGS. 10*a*, 10*b*, and 10*c*, provide a comparison. In FIG. 10*a*, a SAR image with range stripes is shown. The energy of the ambiguous target is smeared in the range direction. Therefore, the sum of the energy in range direction is an indication of the algorithm performance. Plots of the range sum of region 1 (the area bounded by the longer dashes and dots) of FIG. 10*a* for nadir and the range sum of region 2 (the area bounded by the shorter dashes and dots) of FIG. 10*a* for range ambiguity (vs azimuth) are presented in FIGS. 10*b* and 10*c*, respectively, compared to a plot of the range sum (vs azimuth) of a default image. The default image is the image acquired with waveform diversity, but before the step of processing to use the waveform diversity to suppress the nadir and range ambiguities. After processing, the nadir ambiguity is observed to be suppressed both quantitatively and qualitatively within the regions where the desired signal is dominated by the nadir return. In FIG. 10*c*, the range ambiguity suppression performance is presented. Although qualitatively the range ambiguities are seen to be substantially suppressed, the background returns within the range ambiguous region are not low enough to allow for quantitatively validating a suppression performance of more than 4 dB using this method To obtain more performance data, another experiment with a very high incidence angle and PRF was designed. Nadir is not within the swath in this case, but the range ambiguity is quite strong as it is shown in FIGS. 11*a*, 11*b*, and 11*c*. Clearly, the default image shown in FIG. 11*a* is highly affected with the range ambiguity. The ambiguous image shown in FIG. 11*b* proves that the anomalies in the default image are the result of the range ambiguity. The range ambiguity in the desired image is dramatically suppressed as it is seen qualitatively in FIG. 11*c*. To quantify the power, the range sum of the region is compared with the default in FIG. 11*d*. It is seen that the power is certainly suppressed, but the background reflectivity is again quite high, this preventing the suppression ratio to be quantified at more than 8 dB despite the method clearly working to remove range ambiguities. Lastly, the strong targets in the unambiguous regions may also be suppressed as a result of false alarms.

In some embodiments of the present invention, a novel nadir and range ambiguity suppression method is proposed. The method is based on using waveform diversity based on UDC combined with APC, and a double dual focusing technique that includes nadir and range ambiguity detection. It is shown that the nadir can be detected not only for preserving the desired signal while suppressing the nadir but also for applications that requires the satellite altitude, altimetry etc. The range ambiguous images are also presented to prove that the anomalies in the unambiguous image are the result of range ambiguities. The method is verified and validated real world SAR data.

There is described in the foregoing a satellite suitable for implementing any of the methods of operation described here. For a satellite or other platform already in orbit, the methods described here may be implemented by suitably controlling the satellite, for example from the ground using a suitable computing system. In other words, a SAR may be operated from the ground and some of the methods described here may be implemented in software. Therefore, in an aspect the invention may provide a computer readable medium comprising instructions which, when implemented by a processor in a computing system, cause the computing system to operate a SAR according to any of the methods described here.

Some embodiments of the invention described here provide a ground station computing system configured to operate a SAR according to any of the methods described here.

In any of the embodiments of the invention, the satellite may be travelling in, or configured to travel in a low earth orbit.

Any of the computing systems described here may be combined in a single computing system with multiple functions. Similarly, the functions of any of the computing systems described herein may be distributed across multiple computing systems.

Some operations of the methods described herein may be performed by software in machine readable form e.g., in the form of a computer program comprising computer program code. Thus, some aspects of the invention provide a computer readable medium which when implemented in a computing system cause the system to perform some or all of the operations of any of the methods described herein. The computer readable medium may be in transitory or tangible (or non-transitory) form such as storage media include disks, thumb drives, memory cards etc. The software can be suitable for execution on a parallel processor or a serial processor such that the method operations may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The embodiments described above are largely automated. In some examples a user or operator of the system may manually instruct some operations of the method to be carried out.

In the described embodiments of the invention the system may be implemented as any form of a computing and/or electronic system as noted elsewhere herein. For example, the ground station may comprise such a computing and/or electronic system. Such a system may comprise one or more processors which may be microprocessors, controllers, or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system, or any other suitable platform software may be provided at the computing-based device to enable application software to be executed on the device.

The term "computing system" is used herein to refer to any device with processing capability such that it can execute instructions. Those skilled in the art will realise that such processing capabilities may be incorporated into many different devices and therefore the term "computing system" includes PCs, servers, smart mobile telephones, personal digital assistants, and many other devices.

It will be understood that the benefits and advantages described above may relate to one embodiment or may relate to several embodiments. The embodiments are not limited to those that solve any, or all of, the stated problems, or those that have any or all of the stated benefits and advantages.

Any reference to "an" item or "piece" refers to one or more of those items unless otherwise stated. The term "comprising" is used herein to mean including the method steps or operations or elements identified, but that such steps or operations or elements do not comprise an exclusive list and a method or apparatus may contain additional steps or operations or elements.

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

The order of the steps or operations of the methods described herein is exemplary, but the steps or operations may be carried out in any suitable order, or simultaneously where appropriate. Additionally, steps or operations may be added or substituted in, or individual steps or operations may be deleted from any of the methods without departing from the scope of the subject matter described herein. Aspects of any of the examples described above may be combined with aspects of any of the other examples described to form further examples.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

LIST OF REFERENCES

[1] Herman Rohling, "Radar CFAR Thresholding in Clutter and Multiple Target Situations," IEEE Transactions on Aerospace and Electronic Systems, vol. 19, pp. 608-621, 1983.

[2] X. Wen, X. Qiu, B. Han, C. Ding, B. Lei and Q. Chen, "A Range Ambiguity Suppression Processing Method for Spaceborne SAR with Up and Down Chirp Modulation", Sensors 2018, 18, 1454. https://doi.org/10.3390/s18051454

The invention claimed is:

1. A method of operating a synthetic aperture radar "SAR" to acquire SAR echo data for a formation of an image, wherein the SAR is carried on a platform travelling with respect to a surface of Earth and is directed toward the surface of the Earth, the method comprising:

calculating a nadir ambiguity index for a nadir of the platform before data acquisition from a target area to be imaged, wherein the nadir ambiguity index depends on one or more of a slant range to a far extent of the target area to be imaged, an estimated distance from the platform to the nadir, and a pulse repetition rate of a waveform;

selecting a frequency sweep direction sequence from a plurality of frequency sweep direction sequences for successive pulses of a waveform to be transmitted by the SAR to the target area to be imaged based on the nadir ambiguity index;

selecting a relative phase sequence for the successive pulses of the waveform based on the range ambiguity index, wherein the range ambiguity index depends on one or more of the slant range to the far extent of the target area to be imaged, the estimated distance from the platform to an ambiguous point, and the pulse repetition rate of the waveform; and encoding the waveform with the selected frequency sweep direction sequence and the relative phase sequence.

2. The method of claim 1, wherein a same frequency sweep direction sequence is selected for all instances where the nadir ambiguity index is odd and a plurality of different of frequency sweep direction sequences are selected for different even values of nadir ambiguity index.

3. The method of claim 1, wherein the selecting a relative phase sequence for the successive pulses of the waveform comprises calculating a range ambiguity index for a point in an ambiguous region other than the nadir, and determining a relative phase sequence for the waveform based on the calculated range ambiguity index.

4. The method of claim 3, wherein the determination of relative phase sequence depends on whether the range ambiguity index is odd or even.

5. The method of claim 1 comprising processing received raw echo SAR echo data according to an ambiguous image and an unambiguous image, wherein the ambiguous image is an image other than nadir.

6. The method of claim 5, further comprising focusing the SAR echo data using a filter matched to the nadir echo.

7. The method of claim 6, further comprising:

detecting the nadir of the SAR echo data; and suppressing the nadir from the SAR echo data.

8. The method of claim 6, further comprising:

extracting the nadir from the SAR echo data; and dual focusing the SAR echo data according to an ambiguous echo signal.

9. The method of claim 8, wherein the dual focusing comprises:

inverse focusing using a conjugate of the filter that is matched to nadir echo signal; and focusing the SAR echo data using a filter matched to the ambiguous echo signal to produce a focused ambiguous image, and the method further comprising:

detecting the focused ambiguous image of the SAR echo data; and suppressing the focused ambiguous image from the SAR echo data.

10. The method of claim 9, further comprising:

extracting the focused image of an ambiguous region from the SAR echo data; and dual focusing the SAR echo data according to unambiguous echo signal, and wherein dual focusing the SAR echo data according to unambiguous echo signal comprises:

inverse focusing the SAR echo data; and focusing the SAR echo data using a filter matched to the unambiguous echo signal to produce a focused unambiguous image from the SAR echo data.

11. The method of claim 6, further comprising focusing the SAR echo data using a filter matched to an ambiguous echo signal to produce a focused ambiguous image, wherein the focusing comprises performing:

range compression using a filter matched to the ambiguous echo signal;

range cell migration correction, wherein a range cell migration term in a range envelope of the ambiguous echo signal is a function of distance to an ambiguous region; and azimuth compression with respect to a distance to nadir, wherein an azimuthal pulse rate of the ambiguous echo signal is a function of the nadir ambiguity index and the distance to nadir.

12. The method of claim 11, further comprising:

detecting the focused ambiguous image of the SAR echo data;

suppressing the focused ambiguous image from the SAR echo data; and extracting the focused ambiguous image from the SAR echo data; and focusing the SAR echo data using a filter matched to an unambiguous echo signal to obtain a focused unambiguous image, wherein the focusing comprises:

range compression using a filter matched to the unambiguous echo signal;

range cell migration correction, wherein a range cell migration term in a range envelope of the unambiguous echo signal is a function of distance to the ambiguous region; and azimuth compression with respect to and a distance to nadir, wherein an azimuthal pulse rate of the unambiguous echo signal is a function of the nadir ambiguity index and the distance to nadir.

13. The method of claim 6, further comprising dual focusing the SAR echo data according to unambiguous echo signal, and wherein the dual focusing the SAR echo data according to unambiguous echo signal comprises:

inverse focusing the SAR echo data; and focusing the SAR echo data using a filter matched to an unambiguous echo signal to produce a focused unambiguous image from the SAR echo data.

14. The method of claim 5, further comprising focusing the SAR echo data using a filter matched to an unambiguous echo signal to produce a focused unambiguous image.

15. The method of claim 13, further comprising:

detecting the focused unambiguous image of the SAR echo data; and suppressing the focused unambiguous image from the SAR echo data.

16. The method of claim 14, further comprising dual focusing the SAR echo data according to ambiguous echo signal, and wherein dual focusing the SAR echo data according to ambiguous echo signal comprises:

inverse focusing the SAR echo data; and focusing the SAR echo data using a filter matched to an ambiguous echo signal to obtain a focused image of an ambiguous region.

17. The method of claim 6, further comprising focusing the SAR echo data using a filter matched to an unambiguous echo signal to produce a focused unambiguous image, wherein the focusing comprises:

range compression using a filter matched to the unambiguous echo signal;

range cell migration correction, wherein a range cell migration term in a range envelope of the unambiguous echo signal is a function of the distance to an unambiguous region; and azimuth compression with respect to a distance to nadir, wherein an azimuthal pulse rate of an unambiguous echo signal is a function of the nadir ambiguity index and the distance to nadir.

18. The method of claim 17, further comprising:

detecting a focused unambiguous image of the SAR echo data; and suppressing the focused unambiguous image from the SAR echo data; and focusing the SAR echo data using a filter matched to an ambiguous echo signal to obtain a focused ambiguous image, wherein the focusing comprises:

range compression using a filter matched to the ambiguous echo signal;

range cell migration correction, wherein a range cell migration term in a range envelope of the ambiguous echo signal is a function of distance to an ambiguous region; and azimuth compression with respect to a distance to nadir, wherein an azimuthal pulse rate of the ambiguous echo signal is a function of the nadir ambiguity index and the distance to nadir.

19. A computing system comprising a non-transitory computer-readable medium that stores processor-executable instructions which, when executed by at least one processor, controls a synthetic aperture radar "SAR" to operate by performing a method comprising:

calculating a nadir ambiguity index for a nadir of a SAR platform before data acquisition from a target area to be imaged, wherein the nadir ambiguity index depends on one or more of a slant range to a far extent of the target area to be imaged, an estimated distance from the platform to the nadir, and a pulse repetition rate of a waveform;

selecting a frequency sweep direction sequence from a plurality of frequency sweep direction sequences for successive pulses of a waveform to be transmitted by the SAR to the target area to be imaged based on the nadir ambiguity index;

selecting a relative phase sequence for the successive pulses of the waveform based on the range ambiguity index, wherein the range ambiguity index depends on one or more of the slant range to the far extent of the target area to be imaged, the estimated distance from the platform to an ambiguous point, and the pulse repetition rate of the waveform; and encoding the waveform with the selected frequency sweep direction sequence and the relative phase sequence.

20. A synthetic aperture radar (SAR) system comprising one or more processors and configured to transmit successive pulses of radio waves to illuminate a target area by performing a method comprising:

calculating a nadir ambiguity index for a nadir of a platform before data acquisition from a target area to be imaged, wherein the nadir ambiguity index depends on one or more of a slant range to a far extent of the target area to be imaged, an estimated distance from the platform to the nadir, and a pulse repetition rate of a waveform;

selecting a frequency sweep direction sequence from a plurality of frequency sweep direction sequences for successive pulses of a waveform to be transmitted by the SAR to the target area to be imaged based on the nadir ambiguity index;

selecting a relative phase sequence for the successive pulses of the waveform based on the range ambiguity index, wherein the range ambiguity index depends on one or more of the slant range to the far extent of the target area to be imaged, the estimated distance from the platform to an ambiguous point, and the pulse repetition rate of the waveform; and encoding the waveform with the selected frequency sweep direction sequence and the relative phase sequence.

* * * * *